US012701481B2

(12) United States Patent
Caporal Del Barrio et al.

(10) Patent No.: US 12,701,481 B2
(45) Date of Patent: Aug. 4, 2026

(54) APPARATUS, METHOD, AND COMPUTER PROGRAM

(71) Applicant: Nokia Technologies Oy, Espoo (FI)

(72) Inventors: Samantha Caporal Del Barrio, Aalborg (DK); Ahmad Awada, Munich (DE); Halit Murat Gürsu, Munich (DE); Ali Karimidehkordi, Munich (DE); Panagiotis Spapis, Munich (DE); Umur Karabulut, Munich (DE)

(73) Assignee: Nokia Technologies Oy, Espoo (FI)

( * ) Notice: Subject to any disclaimer, the term of this patent is extended or adjusted under 35 U.S.C. 154(b) by 230 days.

(21) Appl. No.: 18/483,158

(22) Filed: Oct. 9, 2023

(65) Prior Publication Data

US 2024/0121687 A1 Apr. 11, 2024

(30) Foreign Application Priority Data

Oct. 10, 2022 (GB) ...................................... 2214871

(51) Int. Cl.
*H04W 36/00* (2009.01)
*H04W 36/26* (2009.01)

(52) U.S. Cl.
CPC ....... *H04W 36/26* (2013.01); *H04W 36/0058* (2018.08)

(58) Field of Classification Search
CPC ......... H04W 36/0055; H04W 36/0058; H04W 36/16; H04W 36/165; H04W 36/24; H04W 36/26; H04W 52/00; H04W 52/02; H04W 52/04; H04W 52/146; H04W 52/18
See application file for complete search history.

(56) References Cited

U.S. PATENT DOCUMENTS

| | | | |
|---|---|---|---|
| 9,237,532 B2 * | 1/2016 | Kazmi | ................ H04W 36/302 |
| 2011/0038276 A1 * | 2/2011 | Ninagawa | .............. H04B 7/155 |
| | | | 370/332 |
| 2020/0068493 A1 | 2/2020 | Ding et al. | |
| 2020/0314812 A1 | 10/2020 | Xu et al. | |

(Continued)

FOREIGN PATENT DOCUMENTS

| | | |
|---|---|---|
| WO | 2020/088736 A1 | 5/2020 |
| WO | 2021/174517 A1 | 9/2021 |
| WO | 2021/191498 A1 | 9/2021 |

(Continued)

OTHER PUBLICATIONS

"3rd Generation Partnership Project; Technical Specification Group Radio Access Network; NR; Medium Access Control (MAC) protocol specification (Release 15)", 3GPP TS 38.321, V15.3.0, Sep. 2018, pp. 1-76.

(Continued)

*Primary Examiner* — Matthew W Genack
(74) *Attorney, Agent, or Firm* — Barta Jones, PLLC

(57) ABSTRACT

There is provided a method, apparatus, and computer program for causing a centralized unit of a second access point to perform: signalling, to a first distributed unit of a first access point configured to provide a serving cell to a user equipment, a plurality of power control parameters associated with a target cell and a reconfiguration instruction for configuring the user equipment to report uplink measurements with an indication of whether a maximum permissible exposure event has occurred.

4 Claims, 14 Drawing Sheets

(56) References Cited

U.S. PATENT DOCUMENTS

2024/0121688 A1*    4/2024    Zhou ................. H04W 36/0058

FOREIGN PATENT DOCUMENTS

WO    2021/224541 A1    11/2021
WO    2021/234213 A1    11/2021
WO    2022/186738 A1     9/2022
WO    2022/205300 A1    10/2022
WO    2022/207204 A1    10/2022

OTHER PUBLICATIONS

"3rd Generation Partnership Project; Technical Specification Group Radio Access Network; NR; Requirements for support of radio resource management (Release 17)", 3GPP TS 38.133, V17.5.0, Mar. 2022, 3407 pages.

"3rd Generation Partnership Project; Technical Specification Group Radio Access Network; NG-RAN; Architecture description (Release 17)", 3GPP TS 38.401, V17.0.0, Apr. 2022, pp. 1-115.

"3rd Generation Partnership Project; Technical Specification Group Radio Access Network; Evolved Universal Terrestrial Radio Access (E-UTRA) and NR; Multi-connectivity; Stage 2 (Release 17)", 3GPP TS 37.340, V17.0.0, Mar. 2022, pp. 1-110.

"Msc-generator", Sourceforge, Retrieved on Nov. 10, 2023, Webpage available at : https://sourceforge.net/projects/msc-generator/.

"New WID on Further NR mobility enhancements", 3GPP TSG RAN Meeting #94e, RP-213565, Agenda: 8A.2, MediaTek, Dec. 6-17, 2021, 5 pages.

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

"3rd Generation Partnership Project; Technical Specification Group Radio Access Network; NR; User Equipment (UE) radio transmission and reception; Part 1: Range 1 Standalone (Release 16)", 3GPP TS 38.101-1, V16.13.0, Sep. 2022, 419 pages.

"3rd Generation Partnership Project; Technical Specification Group Radio Access Network; NR; User Equipment (UE) radio transmission and reception; Part 2: Range 2 Standalone (Release 16)", 3GPP TS 38.101-2, V16.13.0, Sep. 2022, pp. 1-176.

"3rd Generation Partnership Project; Technical Specification Group Radio Access Network; NR; User Equipment (UE) radio transmission and reception; Part 3: Range 1 and Range 2 Interworking operation with other radios (Release 16)", 3GPP TS 38.101-3, V16.13.0, Sep. 2022, 542 pages.

"3rd Generation Partnership Project; Technical Specification Group Radio Access Network; NR; User Equipment (UE) radio transmission and reception; Part 4: Performance requirements (Release 16)", 3GPP TS 38.101-4, V16.10.0, Sep. 2022, pp. 1-509.

"IEEE 802.11", Wikipedia, Retrieved on Nov. 4, 2023, Webpage available at : https://en.wikipedia.org/wiki/IEEE_802.11.

"3rd Generation Partnership Project; Technical Specification Group Radio Access Network; NR; Physical layer procedures for control (Release 17)", 3GPP TS 38.213, V17.3.0, Sep. 2022, pp. 1-260.

Search Report received for corresponding United Kingdom Patent Application No. 2214871.2, dated Apr. 12, 2023, 5 pages.

Extended European Search Report received for corresponding European Patent Application No. 23202306.9, dated Apr. 5, 2024, 11 pages.

* cited by examiner

APPARATUS, METHOD, AND COMPUTER PROGRAM

FIELD OF THE DISCLOSURE

The examples described herein generally relate to apparatus, methods, and computer programs, and more particularly (but not exclusively) to apparatus, methods and computer programs for apparatuses.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to a first aspect, there is provided a method for an apparatus for a first distributed unit of a first access point configured to provide a serving cell to a user equipment, the method comprising: receiving, from a centralized unit of a second access point, a plurality of power control parameters associated with a target cell and a reconfiguration instruction for configuring the user equipment to report uplink measurements with an indication of whether a maximum permissible exposure event has occurred; providing the reconfiguration instruction to the user equipment; receiving at least one first uplink measurement report from the user equipment in accordance with the reconfiguration instruction; using the at least one first uplink measurement report and the plurality of power control parameters for determining to trigger an uplink signalling change procedure at the user equipment for causing the user equipment to be served by the target cell; and signalling the user equipment to trigger said uplink signalling change procedure.

The uplink signalling change procedure may be at least one of a handover procedure; and an inter-cell assistance procedure.

The method may comprise, prior to said receiving from the centralized unit: receiving, from the user equipment, at least one second measurement report from the user equipment, the at least one second measurement report comprising an indication that a maximum permissible exposure event has occurred signalling; and forwarding the received at least one second measurement report to the centralised unit.

The method may comprise, prior to receiving the at least one second measurement report: receiving, from the centralized unit, a configuration for causing the first distributed unit to report any received indication of a maximum permissible exposure event degrading an uplink transmission from the user equipment; and when any measurement report is received by the first distributed unit that indicates that a maximum permissible exposure event has degraded uplink transmissions made by the user equipment, signalling said any measurement report to the centralised unit and a plurality of power control parameters associated with the first distributed unit.

The receiving the at least one first uplink measurement report from the user equipment in accordance with the reconfiguration instruction may comprise receiving the at least one first uplink measurement report using layer two signalling.

The method may comprise: receiving, from the centralised unit, an instruction to abstain from triggering a mobility event at the user equipment when a pre-determined event is detected, the triggering being associated with at least one trigger condition; and abstaining from triggering the mobility event when the pre-determined event is detected.

The method may comprise: monitoring the pre-determined event to determine when the pre-determined event has ceased; and when it is determined that the predetermined event has ceased, enabling the triggering of the mobility event when the at least one trigger condition is fulfilled.

The mobility event may comprise a lower layer mobility event, and/or the pre-determined event may comprise the receipt of a Maximum Permissible Exposure event report from the user equipment.

The plurality of power control parameters may be provided in the same signalling as the reconfiguration instruction, but separately from the reconfiguration instruction.

The plurality of power control parameters associated with the target cell and the reconfiguration instruction for configuring the user equipment to report uplink measurements with an indication of whether a maximum permissible exposure event has occurred may be signalled using network layer signalling.

The plurality of power control parameters may comprise at least one of: a baseline power to use for uplink transmissions to be made by the user equipment; a scaling factor for use by the user equipment during open loop power control procedures; and time and/or physical resources for use by the user equipment for uplink transmissions.

According to a second aspect, there is provided a method for an apparatus for a centralized unit of a second access point, the method comprising: signalling, to a first distributed unit of a first access point configured to provide a serving cell to a user equipment, a plurality of power control parameters associated with a target cell and a reconfiguration instruction for configuring the user equipment to report uplink measurements with an indication of whether a maximum permissible exposure event has occurred.

The method may comprise: signalling, to the first distributed unit, a configuration for causing the first distributed unit to report any received indication of a maximum permissible exposure event degrading an uplink transmission from the user equipment; and receiving, from the first distributed unit, at least one first measurement report comprising an indication that a maximum permissible exposure event has degraded uplink transmissions made by the user equipment and a plurality of power control parameters associated with the first distributed unit.

The method may comprise, in response to receiving said indication: signalling, to a second distributed unit configured to provide the target cell, a request for the plurality of power control parameters associated with the target cell; receiving, from the second distributed unit, the requested plurality of power control parameters associated with the target cell; using the at least one first uplink measurement report and the plurality of power control parameters associated with the first and second distributed units for determining to trigger an uplink signalling change procedure at the user equipment for causing the user equipment to be served by the target cell; and signalling the reconfiguration instruction to trigger said uplink signalling change procedure.

The uplink signalling change procedure may comprise at least one of a handover procedure; and an inter-cell assistance procedure.

The method may comprise signalling, to the first distributed unit, an instruction to abstain from triggering a mobility event at the user equipment when a pre-determined event is detected, the triggering being associated with at least one trigger condition.

The mobility event may comprise a lower layer mobility event, and/or the pre-determined event may comprise the receipt of a Maximum Permissible Exposure event report from the user equipment.

The plurality of power control parameters may be provided in the same signalling as the reconfiguration instruction, but separately from the reconfiguration instruction.

The plurality of power control parameters associated with the target cell and the reconfiguration instruction for configuring the user equipment to report uplink measurements with an indication of whether a maximum permissible exposure event has occurred may be signalled using network layer signalling.

The plurality of power control parameters may comprise at least one of: a baseline power to use for uplink transmissions to be made by the user equipment; a scaling factor for use by the user equipment during open loop power control procedures; and time and/or physical resources for use by the user equipment for uplink transmissions.

According to a third aspect, there is provided an apparatus for a first distributed unit of a first access point configured to provide a serving cell to a user equipment, the apparatus comprising means for: receiving, from a centralized unit of a second access point, a plurality of power control parameters associated with a target cell and a reconfiguration instruction for configuring the user equipment to report uplink measurements with an indication of whether a maximum permissible exposure event has occurred; providing the reconfiguration instruction to the user equipment; receiving at least one first uplink measurement report from the user equipment in accordance with the reconfiguration instruction; using the at least one first uplink measurement report and the plurality of power control parameters for determining to trigger an uplink signalling change procedure at the user equipment for causing the user equipment to be served by the target cell; and signalling the user equipment to trigger said uplink signalling change procedure.

The uplink signalling change procedure may be at least one of a handover procedure; and an inter-cell assistance procedure.

The apparatus may comprise means for performing, prior to said receiving from the centralized unit: receiving, from the user equipment, at least one second measurement report from the user equipment, the at least one second measurement report comprising an indication that a maximum permissible exposure event has occurred signalling; and forwarding the received at least one second measurement report to the centralised unit.

The apparatus may comprise means for performing, prior to receiving the at least one second measurement report: receiving, from the centralized unit, a configuration for causing the first distributed unit to report any received indication of a maximum permissible exposure event degrading an uplink transmission from the user equipment; and when any measurement report is received by the first distributed unit that indicates that a maximum permissible exposure event has degraded uplink transmissions made by the user equipment, signalling said any measurement report to the centralised unit and a plurality of power control parameters associated with the first distributed unit.

The means for receiving the at least one first uplink measurement report from the user equipment in accordance with the reconfiguration instruction may comprise means for receiving the at least one first uplink measurement report using layer two signalling.

The apparatus may comprise means for performing: receiving, from the centralised unit, an instruction to abstain from triggering a mobility event at the user equipment when a pre-determined event is detected, the triggering being associated with at least one trigger condition; and abstaining from triggering the mobility event when the pre-determined event is detected.

The apparatus may comprise means for performing: monitoring the pre-determined event to determine when the pre-determined event has ceased; and when it is determined that the predetermined event has ceased, enabling the triggering of the mobility event when the at least one trigger condition is fulfilled.

The mobility event may comprise a lower layer mobility event, and/or the pre-determined event may comprise the receipt of a Maximum Permissible Exposure event report from the user equipment.

The plurality of power control parameters may be provided in the same signalling as the reconfiguration instruction, but separately from the reconfiguration instruction.

The plurality of power control parameters associated with the target cell and the reconfiguration instruction for configuring the user equipment to report uplink measurements with an indication of whether a maximum permissible exposure event has occurred may be signalled using network layer signalling.

The plurality of power control parameters may comprise at least one of: a baseline power to use for uplink transmissions to be made by the user equipment; a scaling factor for use by the user equipment during open loop power control procedures; and time and/or physical resources for use by the user equipment for uplink transmissions.

According to a fourth aspect, there is provided an apparatus for a centralized unit of a second access point, the apparatus comprising means for: signalling, to a first distributed unit of a first access point configured to provide a serving cell to a user equipment, a plurality of power control parameters associated with a target cell and a reconfiguration instruction for configuring the user equipment to report uplink measurements with an indication of whether a maximum permissible exposure event has occurred.

The apparatus may comprise means for performing: signalling, to the first distributed unit, a configuration for causing the first distributed unit to report any received indication of a maximum permissible exposure event degrading an uplink transmission from the user equipment; and receiving, from the first distributed unit, at least one first measurement report comprising an indication that a maximum permissible exposure event has degraded uplink transmissions made by the user equipment and a plurality of power control parameters associated with the first distributed unit.

The apparatus may comprise means for performing, in response to receiving said indication: signalling, to a second distributed unit configured to provide the target cell, a request for the plurality of power control parameters associated with the target cell; receiving, from the second distributed unit, the requested plurality of power control parameters associated with the target cell; using the at least one first uplink measurement report and the plurality of power control parameters associated with the first and second distributed units for determining to trigger an uplink signalling change procedure at the user equipment for causing the user equipment to be served by the target cell; and signalling the reconfiguration instruction to trigger said uplink signalling change procedure.

The uplink signalling change procedure may comprise at least one of a handover procedure; and an inter-cell assistance procedure.

The apparatus may comprise means for performing signalling, to the first distributed unit, an instruction to abstain from triggering a mobility event at the user equipment when a pre-determined event is detected, the triggering being associated with at least one trigger condition.

The mobility event may comprise a lower layer mobility event, and/or the pre-determined event may comprise the receipt of a Maximum Permissible Exposure event report from the user equipment.

The plurality of power control parameters may be provided in the same signalling as the reconfiguration instruction, but separately from the reconfiguration instruction.

The plurality of power control parameters associated with the target cell and the reconfiguration instruction for configuring the user equipment to report uplink measurements with an indication of whether a maximum permissible exposure event has occurred may be signalled using network layer signalling.

The plurality of power control parameters may comprise at least one of: a baseline power to use for uplink transmissions to be made by the user equipment; a scaling factor for use by the user equipment during open loop power control procedures; and time and/or physical resources for use by the user equipment for uplink transmissions.

According to a fifth aspect, there is provided an apparatus for a first distributed unit of a first access point configured to provide a serving cell to a user equipment, the apparatus comprising: at least one processor; and at least one memory comprising code that, when executed by the at least one processor, causes the apparatus to perform: receiving, from a centralized unit of a second access point, a plurality of power control parameters associated with a target cell and a reconfiguration instruction for configuring the user equipment to report uplink measurements with an indication of whether a maximum permissible exposure event has occurred; providing the reconfiguration instruction to the user equipment; receiving at least one first uplink measurement report from the user equipment in accordance with the reconfiguration instruction; using the at least one first uplink measurement report and the plurality of power control parameters for determining to trigger an uplink signalling change procedure at the user equipment for causing the user equipment to be served by the target cell; and signalling the user equipment to trigger said uplink signalling change procedure.

The uplink signalling change procedure may be at least one of a handover procedure; and an inter-cell assistance procedure.

The apparatus may be caused to perform, prior to said receiving from the centralized unit: receiving, from the user equipment, at least one second measurement report from the user equipment, the at least one second measurement report comprising an indication that a maximum permissible exposure event has occurred signalling; and forwarding the received at least one second measurement report to the centralised unit.

The apparatus may be caused to perform, prior to receiving the at least one second measurement report: receiving, from the centralized unit, a configuration for causing the first distributed unit to report any received indication of a maximum permissible exposure event degrading an uplink transmission from the user equipment; and when any measurement report is received by the first distributed unit that indicates that a maximum permissible exposure event has degraded uplink transmissions made by the user equipment, signalling said any measurement report to the centralised unit and a plurality of power control parameters associated with the first distributed unit.

The receiving the at least one first uplink measurement report from the user equipment in accordance with the reconfiguration instruction may comprise receiving the at least one first uplink measurement report using layer two signalling.

The apparatus may be caused to perform: receiving, from the centralised unit, an instruction to abstain from triggering a mobility event at the user equipment when a pre-determined event is detected, the triggering being associated with at least one trigger condition; and abstaining from triggering the mobility event when the pre-determined event is detected.

The apparatus may be caused to perform: monitoring the pre-determined event to determine when the pre-determined event has ceased; and when it is determined that the predetermined event has ceased, enabling the triggering of the mobility event when the at least one trigger condition is fulfilled.

The mobility event may comprise a lower layer mobility event, and/or the pre-determined event may comprise the receipt of a Maximum Permissible Exposure event report from the user equipment.

The plurality of power control parameters may be provided in the same signalling as the reconfiguration instruction, but separately from the reconfiguration instruction.

The plurality of power control parameters associated with the target cell and the reconfiguration instruction for configuring the user equipment to report uplink measurements with an indication of whether a maximum permissible exposure event has occurred may be signalled using network layer signalling.

The plurality of power control parameters may comprise at least one of: a baseline power to use for uplink transmissions to be made by the user equipment; a scaling factor for use by the user equipment during open loop power control procedures; and time and/or physical resources for use by the user equipment for uplink transmissions.

According to a sixth aspect, there is provided an apparatus for a centralized unit of a second access point, the apparatus comprising: at least one processor; and at least one memory comprising code that, when executed by the at least one processor, causes the apparatus to perform: signalling, to a first distributed unit of a first access point configured to provide a serving cell to a user equipment, a plurality of power control parameters associated with a target cell and a reconfiguration instruction for configuring the user equipment to report uplink measurements with an indication of whether a maximum permissible exposure event has occurred.

The apparatus may be caused to perform: signalling, to the first distributed unit, a configuration for causing the first distributed unit to report any received indication of a maximum permissible exposure event degrading an uplink transmission from the user equipment; and receiving, from the first distributed unit, at least one first measurement report comprising an indication that a maximum permissible exposure event has degraded uplink transmissions made by the user equipment and a plurality of power control parameters associated with the first distributed unit.

The apparatus may be caused to perform, in response to receiving said indication: signalling, to a second distributed unit configured to provide the target cell, a request for the plurality of power control parameters associated with the target cell; receiving, from the second distributed unit, the requested plurality of power control parameters associated with the target cell; using the at least one first uplink measurement report and the plurality of power control parameters associated with the first and second distributed units for determining to trigger an uplink signalling change procedure at the user equipment for causing the user equipment to be served by the target cell; and signalling the reconfiguration instruction to trigger said uplink signalling change procedure.

The uplink signalling change procedure may comprise at least one of a handover procedure; and an inter-cell assistance procedure.

The apparatus may be caused to perform signalling, to the first distributed unit, an instruction to abstain from triggering a mobility event at the user equipment when a pre-determined event is detected, the triggering being associated with at least one trigger condition.

The mobility event may comprise a lower layer mobility event, and/or the pre-determined event may comprise the receipt of a Maximum Permissible Exposure event report from the user equipment.

The plurality of power control parameters may be provided in the same signalling as the reconfiguration instruction, but separately from the reconfiguration instruction.

The plurality of power control parameters associated with the target cell and the reconfiguration instruction for configuring the user equipment to report uplink measurements with an indication of whether a maximum permissible exposure event has occurred may be signalled using network layer signalling.

The plurality of power control parameters may comprise at least one of: a baseline power to use for uplink transmissions to be made by the user equipment; a scaling factor for use by the user equipment during open loop power control procedures; and time and/or physical resources for use by the user equipment for uplink transmissions.

According to a seventh aspect, there is provided an apparatus for a first distributed unit of a first access point configured to provide a serving cell to a user equipment, the apparatus comprising: receiving circuitry for receiving, from a centralized unit of a second access point, a plurality of power control parameters associated with a target cell and a reconfiguration instruction for configuring the user equipment to report uplink measurements with an indication of whether a maximum permissible exposure event has occurred; providing circuitry for providing the reconfiguration instruction to the user equipment; receiving circuitry for receiving at least one first uplink measurement report from the user equipment in accordance with the reconfiguration instruction; using circuitry for using the at least one first uplink measurement report and the plurality of power control parameters for determining to trigger an uplink signalling change procedure at the user equipment for causing the user equipment to be served by the target cell; and signalling circuitry for signalling the user equipment to trigger said uplink signalling change procedure.

The uplink signalling change procedure may be at least one of a handover procedure; and an inter-cell assistance procedure.

The apparatus may comprise, prior to said receiving from the centralized unit: receiving circuitry for receiving, from the user equipment, at least one second measurement report from the user equipment, the at least one second measurement report comprising an indication that a maximum permissible exposure event has occurred signalling; and forwarding circuitry for forwarding the received at least one second measurement report to the centralised unit.

The apparatus may comprise, prior to receiving the at least one second measurement report: receiving circuitry for receiving, from the centralized unit, a configuration for causing the first distributed unit to report any received indication of a maximum permissible exposure event degrading an uplink transmission from the user equipment; and when any measurement report is received by the first distributed unit that indicates that a maximum permissible exposure event has degraded uplink transmissions made by the user equipment, signalling circuitry for signalling said any measurement report to the centralised unit and a plurality of power control parameters associated with the first distributed unit.

The receiving circuitry for receiving the at least one first uplink measurement report from the user equipment in accordance with the reconfiguration instruction may comprise receiving circuitry for receiving the at least one first uplink measurement report using layer two signalling.

The apparatus may comprise: receiving circuitry for receiving, from the centralised unit, an instruction to abstain from triggering a mobility event at the user equipment when a pre-determined event is detected, the triggering being associated with at least one trigger condition; and abstaining circuitry for abstaining from triggering the mobility event when the pre-determined event is detected.

The apparatus may comprise: monitoring circuitry for monitoring the pre-determined event to determine when the pre-determined event has ceased; and when it is determined that the predetermined event has ceased, enabling circuitry for enabling the triggering of the mobility event when the at least one trigger condition is fulfilled.

The mobility event may comprise a lower layer mobility event, and/or the pre-determined event may comprise the receipt of a Maximum Permissible Exposure event report from the user equipment.

The plurality of power control parameters may be provided in the same signalling as the reconfiguration instruction, but separately from the reconfiguration instruction.

The plurality of power control parameters associated with the target cell and the reconfiguration instruction for configuring the user equipment to report uplink measurements with an indication of whether a maximum permissible exposure event has occurred may be signalled using network layer signalling.

The plurality of power control parameters may comprise at least one of: a baseline power to use for uplink transmissions to be made by the user equipment; a scaling factor for use by the user equipment during open loop power control procedures; and time and/or physical resources for use by the user equipment for uplink transmissions.

According to an eighth aspect, there is provided an apparatus for a centralized unit of a second access point, the apparatus comprising: signalling circuitry for signalling, to a first distributed unit of a first access point configured to provide a serving cell to a user equipment, a plurality of power control parameters associated with a target cell and a reconfiguration instruction for configuring the user equipment to report uplink measurements with an indication of whether a maximum permissible exposure event has occurred.

The apparatus may comprise: signalling circuitry for signalling, to the first distributed unit, a configuration for causing the first distributed unit to report any received indication of a maximum permissible exposure event degrading an uplink transmission from the user equipment; and receiving circuitry for receiving, from the first distributed unit, at least one first measurement report comprising an indication that a maximum permissible exposure event has degraded uplink transmissions made by the user equipment and a plurality of power control parameters associated with the first distributed unit.

The apparatus may comprise, in response to receiving said indication: signalling circuitry for signalling, to a second distributed unit configured to provide the target cell, a request for the plurality of power control parameters associated with the target cell; receiving circuitry for receiving, from the second distributed unit, the requested plurality of power control parameters associated with the target cell; using circuitry for using the at least one first uplink measurement report and the plurality of power control parameters associated with the first and second distributed units for determining to trigger an uplink signalling change procedure at the user equipment for causing the user equipment to be served by the target cell; and signalling circuitry for signalling the reconfiguration instruction to trigger said uplink signalling change procedure.

The uplink signalling change procedure may comprise at least one of a handover procedure; and an inter-cell assistance procedure.

The apparatus may comprise signalling circuitry for signalling, to the first distributed unit, an instruction to abstain from triggering a mobility event at the user equipment when a pre-determined event is detected, the triggering being associated with at least one trigger condition.

The mobility event may comprise a lower layer mobility event, and/or the pre-determined event may comprise the receipt of a Maximum Permissible Exposure event report from the user equipment.

The plurality of power control parameters may be provided in the same signalling as the reconfiguration instruction, but separately from the reconfiguration instruction.

The plurality of power control parameters associated with the target cell and the reconfiguration instruction for configuring the user equipment to report uplink measurements with an indication of whether a maximum permissible exposure event has occurred may be signalled using network layer signalling.

The plurality of power control parameters may comprise at least one of: a baseline power to use for uplink transmissions to be made by the user equipment; a scaling factor for use by the user equipment during open loop power control procedures; and time and/or physical resources for use by the user equipment for uplink transmissions.

According to a ninth aspect, there is provided non-transitory computer readable medium comprising program instructions for causing an apparatus for a first distributed unit of a first access point configured to provide a serving cell to a user equipment to perform: receiving, from a centralized unit of a second access point, a plurality of power control parameters associated with a target cell and a reconfiguration instruction for configuring the user equipment to report uplink measurements with an indication of whether a maximum permissible exposure event has occurred; providing the reconfiguration instruction to the user equipment; receiving at least one first uplink measurement report from the user equipment in accordance with the reconfiguration instruction; using the at least one first uplink measurement report and the plurality of power control parameters for determining to trigger an uplink signalling change procedure at the user equipment for causing the user equipment to be served by the target cell; and signalling the user equipment to trigger said uplink signalling change procedure.

The uplink signalling change procedure may be at least one of a handover procedure; and an inter-cell assistance procedure.

The apparatus may be caused to perform, prior to said receiving from the centralized unit: receiving, from the user equipment, at least one second measurement report from the user equipment, the at least one second measurement report comprising an indication that a maximum permissible exposure event has occurred signalling; and forwarding the received at least one second measurement report to the centralised unit.

The apparatus may be caused to perform, prior to receiving the at least one second measurement report: receiving, from the centralized unit, a configuration for causing the first distributed unit to report any received indication of a maximum permissible exposure event degrading an uplink transmission from the user equipment; and when any measurement report is received by the first distributed unit that indicates that a maximum permissible exposure event has degraded uplink transmissions made by the user equipment, signalling said any measurement report to the centralised unit and a plurality of power control parameters associated with the first distributed unit.

The receiving the at least one first uplink measurement report from the user equipment in accordance with the reconfiguration instruction may comprise receiving the at least one first uplink measurement report using layer two signalling.

The apparatus may be caused to perform: receiving, from the centralised unit, an instruction to abstain from triggering a mobility event at the user equipment when a pre-determined event is detected, the triggering being associated with at least one trigger condition; and abstaining from triggering the mobility event when the pre-determined event is detected.

The apparatus may be caused to perform: monitoring the pre-determined event to determine when the pre-determined event has ceased; and when it is determined that the predetermined event has ceased, enabling the triggering of the mobility event when the at least one trigger condition is fulfilled.

The mobility event may comprise a lower layer mobility event, and/or the pre-determined event may comprise the receipt of a Maximum Permissible Exposure event report from the user equipment.

The plurality of power control parameters may be provided in the same signalling as the reconfiguration instruction, but separately from the reconfiguration instruction.

The plurality of power control parameters associated with the target cell and the reconfiguration instruction for configuring the user equipment to report uplink measurements with an indication of whether a maximum permissible exposure event has occurred may be signalled using network layer signalling.

The plurality of power control parameters may comprise at least one of: a baseline power to use for uplink transmissions to be made by the user equipment; a scaling factor for use by the user equipment during open loop power control procedures; and time and/or physical resources for use by the user equipment for uplink transmissions.

According to a tenth aspect, there is provided non-transitory computer readable medium comprising program instructions for causing for a centralized unit of a second access point to perform: signalling, to a first distributed unit of a first access point configured to provide a serving cell to a user equipment, a plurality of power control parameters associated with a target cell and a reconfiguration instruction for configuring the user equipment to report uplink measurements with an indication of whether a maximum permissible exposure event has occurred.

The apparatus may be caused to perform: signalling, to the first distributed unit, a configuration for causing the first distributed unit to report any received indication of a maximum permissible exposure event degrading an uplink transmission from the user equipment; and receiving, from the first distributed unit, at least one first measurement report comprising an indication that a maximum permissible exposure event has degraded uplink transmissions made by the user equipment and a plurality of power control parameters associated with the first distributed unit.

The apparatus may be caused to perform, in response to receiving said indication: signalling, to a second distributed unit configured to provide the target cell, a request for the plurality of power control parameters associated with the target cell; receiving, from the second distributed unit, the requested plurality of power control parameters associated with the target cell; using the at least one first uplink measurement report and the plurality of power control parameters associated with the first and second distributed units for determining to trigger an uplink signalling change procedure at the user equipment for causing the user equipment to be served by the target cell; and signalling the reconfiguration instruction to trigger said uplink signalling change procedure.

The uplink signalling change procedure may comprise at least one of a handover procedure; and an inter-cell assistance procedure.

The apparatus may be caused to perform signalling, to the first distributed unit, an instruction to abstain from triggering a mobility event at the user equipment when a pre-determined event is detected, the triggering being associated with at least one trigger condition.

The mobility event may comprise a lower layer mobility event, and/or the pre-determined event may comprise the receipt of a Maximum Permissible Exposure event report from the user equipment.

The plurality of power control parameters may be provided in the same signalling as the reconfiguration instruction, but separately from the reconfiguration instruction.

The plurality of power control parameters associated with the target cell and the reconfiguration instruction for configuring the user equipment to report uplink measurements with an indication of whether a maximum permissible exposure event has occurred may be signalled using network layer signalling.

The plurality of power control parameters may comprise at least one of: a baseline power to use for uplink transmissions to be made by the user equipment; a scaling factor for use by the user equipment during open loop power control procedures; and time and/or physical resources for use by the user equipment for uplink transmissions.

According to an eleventh aspect, there is provided a computer program product stored on a medium that may cause an apparatus to perform any method as described herein.

According to a twelfth aspect, there is provided an electronic device that may comprise apparatus as described herein.

According to a thirteenth aspect, there is provided a chipset that may comprise an apparatus as described herein.

BRIEF DESCRIPTION OF FIGURES

Some examples, will now be described, merely by way of illustration only, with reference to the accompanying drawings in which:

FIG. 5 shows a schematic representation of a network;

DETAILED DESCRIPTION

In the following description of examples, certain aspects are explained with reference to apparatus for determining and effecting a cell change when considering a range of available information. For brevity and clarity, the following describes such aspects with reference to a 5G wireless communication system. However, it is understood that such aspects are not limited to 5G wireless communication systems, and may, for example, be applied to other wireless communication systems (for example, current 6G proposals, IEEE 802.11, etc.).

Before describing in detail the examples, certain general principles of a 5G wireless communication system are briefly explained with reference to FIGS. 1A and 1B.

Figure 1A:
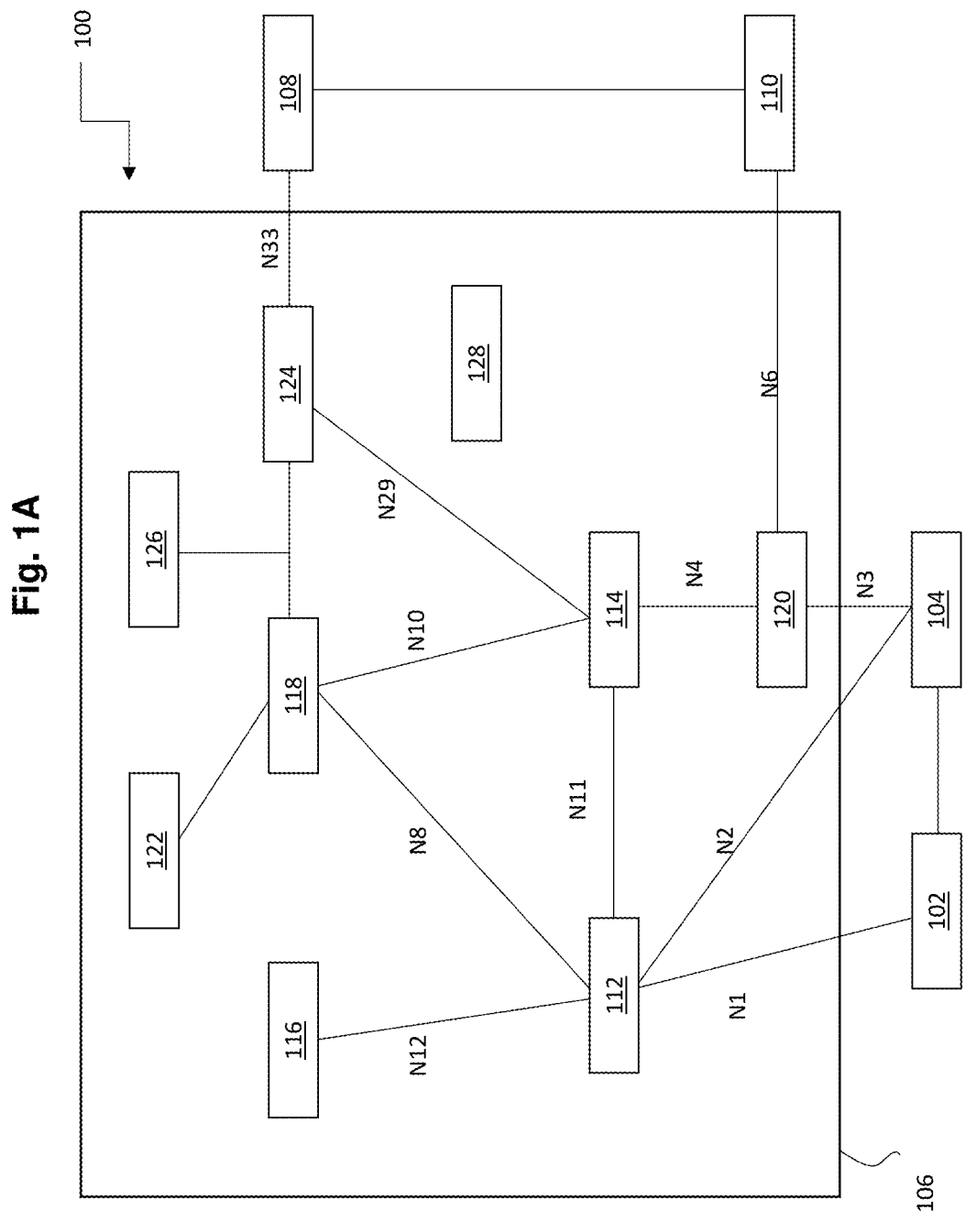
FIGS. 1A and 1B show a schematic representation of a 5G system.

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, and so forth) towards a 3rd party. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS) producer or MDAS Management Service (MnS) producer. The MDAS MnS producer may provide data analytics in the management plane considering parameters including, for example, load level and/or resource utilization. For example, the MDAS MnS producer for a network function (NF) may collect the NF's load-related performance data, e.g., resource usage status of the NF. The analysis of the collected data may provide forecast of resource usage information in a predefined future time window. This analysis may also recommend appropriate actions e.g., scaling of resources, admission control, load balancing of traffic, and so forth.

Figure 1B:
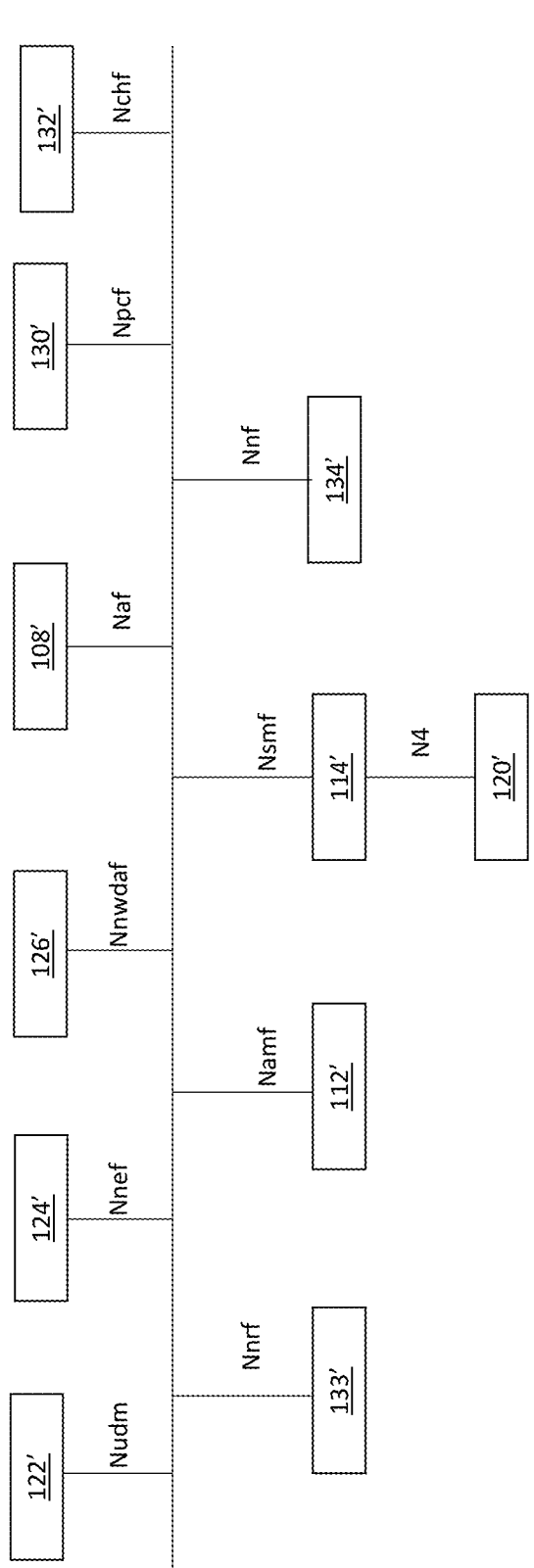

FIG. 1B shows a schematic representation of a 5GC represented in current 3GPP specifications. It is understood that this architecture is intended to illustrate potential components that may be comprised in a core network, and the presently described principles are not limited to core networks comprising only the described components.

FIG. 1B shows a 5GC 106' comprising a UPF 120' connected to an SMF 114' over an N4 interface. The SMF 114' is connected to each of a UDM 122', an NEF 124', an NWDAF 126', an AF 108', a Policy Control Function (PCF) 130', an AMF 112', and a Charging function 132' over an interconnect medium that also connects these network functions to each other. The 5G core 106' further comprises a network repository function (NRF) 133' and a network function 134' that connect to the interconnect medium.

3GPP has issued a number of releases (Rel) for defining operating communication protocols related to a communications network. Currently, objectives and work are being set in relation to Release 18 (Rel. 18).

Governmental exposure guidelines are in place to prevent health issues due to thermal effects arising from powerful radio transmissions. One of these sets of guidelines relates to the Maximum Permissible Exposure (MPE). The MPE regulates power density for the mmWave regime, and the Federal Communications Commission (FCC) sets the threshold for MPE at 10 W/m$^2$ (i.e., 1 mW/cm$^2$). For a certain distance separating the human tissue from the antenna, a UE transmission Power Back-Off (PBO) is used for FCC compliance with MPE.

The PBO is configured to throttle transmissions of UEs that exceed, or are considered to be close to, a specific MPE value. This PBO throttling reduces the power received by the gNB/access point and reduces the uplink Signal to Interference and Noise Ratio (SINR) as well, which may lead to uplink transmission failures.

MPE events may occur more frequently at UEs that have to transmit data across a larger distance relative to other UEs that are in the same cell. For example, for UE's located at cell edges, for non-line-of-sight (NLOS) scenarios, etc. are all more likely to experience MPE-based events (i.e., a limitation in an uplink transmission power in response to detecting that a current uplink transmission power is close to a threshold value) than UEs that are closer to a centre point of a cell and/or for UEs operating with line-of-sight (LOS) transmissions to an access point to a network.

Release 16 agreed to implement MPE Power Management Maximum Power Reduction (P-MPR) reporting to mitigate uplink transmission degradation resulting from MPE events. This reporting indicates that an MPE event has occurred. T P-MPR is a maximum power reduction value applied for satisfying Specific Absorption Rate (SAR) requirement and is determined in consideration of the distance between the device and human body. For example, if the distance between the device and human body is short, then the total transmission power value of the UE should decrease and, for this, a high value of P-MPR is applied. In contrast, if the distance between the device and the human body is long, then it is tolerable to increase the total transmit power value of the device such that P-MPR is set to a low value. P-MPR is associated with the power control such that when multiple carriers are used or data transmission is performed along with other system modem the maximum power allocated per carrier or system is restricted. Such influence is reflected to P-MPR.

The P-MPR report may be formed by using the "P" and Reserved ("R") bits of a Power Headroom Report (PHR), which is a medium access control (MAC) control element used to report the power headroom available in the UE. An MPE event may be reported by setting the "P"-bit to 1, and by setting a P-MPR indication using 2 "R"-bits of the PHR. This is illustrated with respect to FIG. 6.

Figure 6:
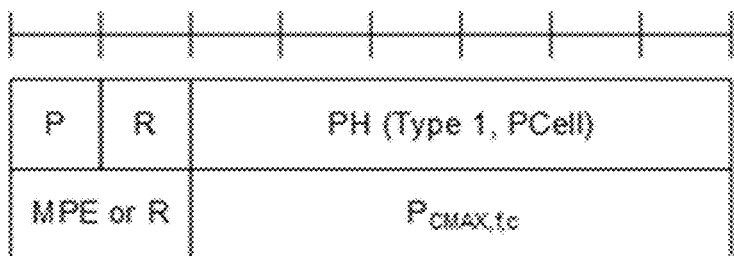
FIG. 6 illustrates an example notification.

FIG. 6 illustrates an example PHR MAC control element. FIG. 6 illustrates that a "P"-bit Section and an "R"-bit section may be used to indicate whether an event is an MPE event or not, while the Power Headroom (PH) section is used to indicate a maximum power headroom level, $P_{CMAX,tc}$ associated with the MPE event. This reporting is an optional UE capability for reporting P-MPR when the reporting conditions configured by gNB are met.

The Rel-16 table for reporting in a P-MPR report is provided as Table 1 below.

TABLE 1

| Mapping of P-MPR | | |
| --- | --- | --- |
| Reported value | Measured quantity value | Unit |
| P-MPR_00 | 3 ≤ P-MPR < 6 | dBm |
| P-MPR_01 | 6 ≤ P-MPR < 9 | dBm |
| P-MPR_02 | 9 ≤ P-MPR < 12 | dBm |
| P-MPR_03 | P-MPR = 12 | dBm |

Rel-17 agreed to provide additional P-MPR reporting in order to enable a UE to report multiple P-MPR values and associated candidate beams. This may be useful for allowing a serving cell to switch Transmission Configuration Indicator (TCI) states (which may indicate how close different transmissions are to each other) upon MPE events to MPE-free beams In particular, Rel-17 agreed to enable the reporting of up to four P-MPR measurement values. The UE may be able to report how many P-MPR measurements that the UE is able to report as part of providing its UE capability to the network. In other words, the UE capability tells network N P-MPR values can be reported where N can be 1, 2, 3 or 4 for a UE. The P-MPR measurement values may be provided on top of current beam reporting mechanisms. In other words, the P-MPR measurement values may be provided with other measurement values specified for reporting beam measurements. Each of the P-MPR values may be associated to one Indicator Synchronization Signal Block (SSB) resource indicator (SSBRI)/Channel state indicator (CSI)-Reference Signal (RS) Resource Indicator (CRI) index. The association may be explicitly configured at the UE, or implicitly inferred by the UE.

Assuming "N" is used to label the number of measurements that a UE is able to report, in addition to the existing fields in the above-described Rel. 16 PHR MAC-control element, N≥1 P-MPR values can be reported by reporting N P-MPR values together with, for each P-MPR value, up to M Synchronization Signal Block (SSB) resource indicator (s) (SSBRI(s))/Channel state indicator (CSI) Resource Indicator (CRI(s)), where the SSBRI(s)/CRI(s) is selected by the UE from a candidate SSB/CSI-RS resource pool Rel-17 RAN1/2 is also currently discussing the applicability of MPE reporting to multi-transmission and reception point scenarios and Inter-Cell Beam Management (ICBM), and N P-MPR reporting is also applicable to ICBM.

The following discusses various protocol stack layers used for mobility-based purposes.

A Centralized Unit (CU) provides support for higher layers of the protocol stack (e.g. RRC).

As of Rel. 15, the measurement configuration for inter-cell mobility is defined as being part of a UE's Radio Resource Control (RRC) configuration. As the RRC is controlled by the CU, the CU is responsible for setting UE measurement configuration. Once the RRC in the CU receives a measurement report from the UE indicating that a target cell has better radio status compared to the source cell, the CU may determine that the UE should be handed over to the target cell via triggering handover preparation with the target cell. This is illustrated below with respect to 7001 to 7005.

After the CU transmits the handover command to the UE, the UE initiates Random Access Channel (RACH) transmission procedures towards the target cell. Further, after the handover command is sent to the UE, the source CU-control plane (CU-CP) initiates the data forwarding procedure and sends the sequence number (SN) status transfer to the target CU-CP. This corresponds to 7006 to 7011.

The sequence number may comprise a Packet Data Convergence Protocol (PDCP) sequence number. The SN status transfer indicates a status of the sequence number of data packets that have previously been transmitted towards the UE. The target node may use this received SN tatus to determine which, if any, data packets the target node has received for the UE may be deleted without attempting to transmit them to the UE.

For example, when the target node has received packets comprising sequence numbers ranging from 70 to 120 and receives an SN status transfer indicating sequence number 101, the target node deletes packets from 70 to 101 and keeps packets 102 and 120. This is because the SN status transfer indicates that all of the packets up to 101 have previously been transmitted to the UE.

During this time, a user plane function (UPF) sends the user plane packets to the source CU-UP and the source CU-UP forwards the user packets to the target CU-UP (in 7012)). The target CU-CP initiates a path switch procedure and, once the path switch procedure has been completed, signals an indication to release the UE context at the source CU side (7013 to 7016). Once the source CU-CP receives a bearer context release message from the target CU-CP, the source CU-CP releases the UE bearer from CU-UP and UE context from the distributed unit (DU) (7017-7019).

Figure 7:
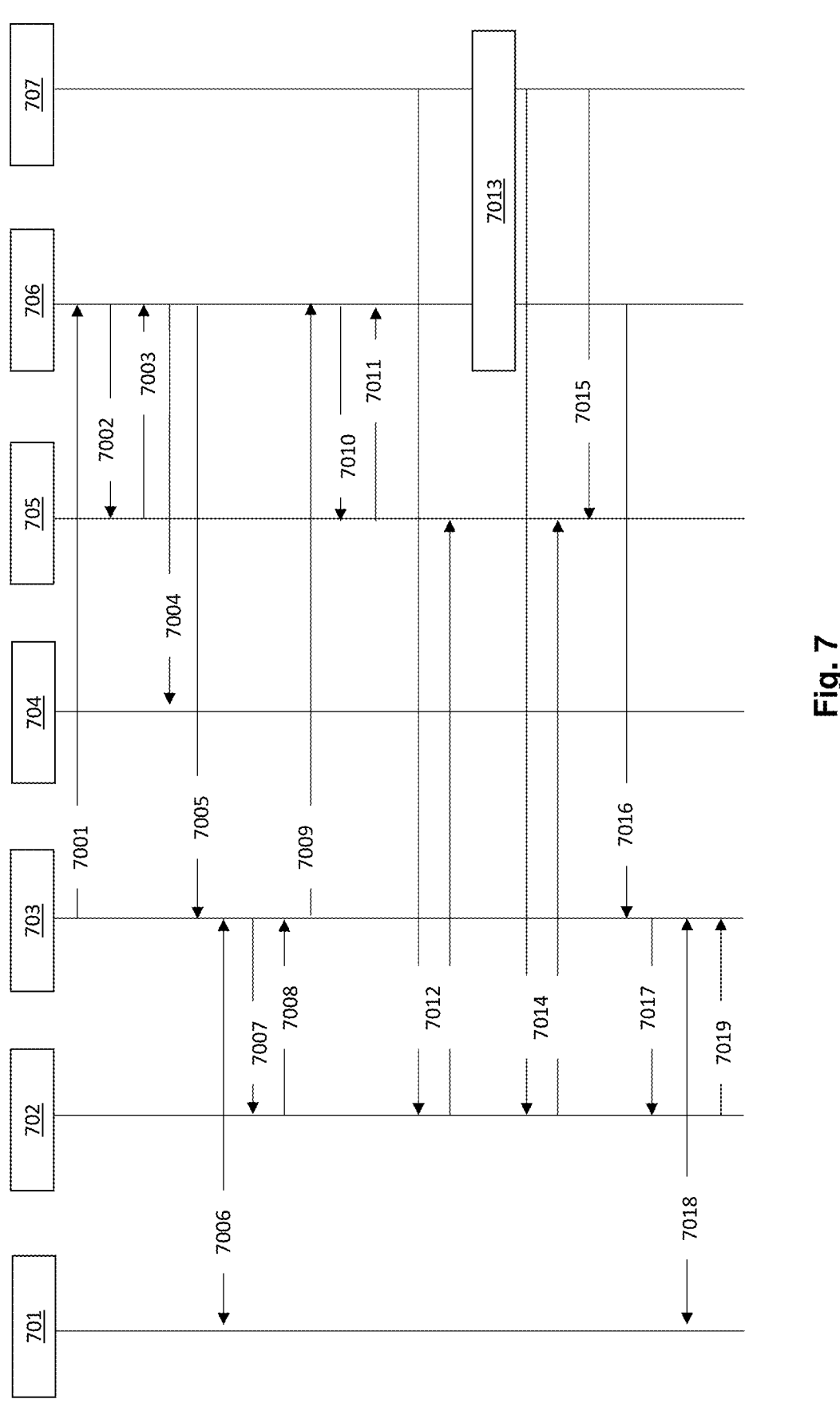
FIGS. 7 to 8 illustrate example signalling.

This inter-gNB handover is illustrated with respect to FIG. 7.

FIG. 7 illustrates signalling that may be performed between a source gNB (comprising a source gNB DU 701, a source gNB CU-CP 702, and a source gNB CU-CP), a target gNB (comprising a target gNB DU 704, a target gNB CU-UP 705, and a target gNB CU-CP 706), and another network function 707, where the another network function may be an AMF and/or a UPF.

During 7001, the source gNB CU-CP 703 signals the target gNB CU-CP 706. This signalling may comprise a handover request in respect of at least one UE.

During 7002, the target gNB CU-CP 706 signals the target gNB CU-UP 705. This signalling may comprise a request to set up a bearer context in respect of the UE.

During 7003, the target gNB CP-UP 705 signals the target gNB CP-CU 706. This signalling may comprise a response to the signalling of 7002, indicating that a bearer configuration has been established in respect of the UE.

During 7004, the target gNB CU CP 706 exchanges signalling with the target gNB DU 704. This signalling may comprise a request to establish a UE F1 context. A UE F1 context may represent a UE context at a distributed unit. The UE D1 context may comprise UE context relating to at least one of a Medium Access Control layer, and/or a Physical layer and/or a radio link control layer.

During 7005, the target gNB CU CP 706 signals the source gNB CU CP 703. This signalling may be an acknowledgement to the handover request of 7001. This signalling may comprise information relating to the bearer configuration established during 7002 to 7003.

During 7006, the source gNB CU CP 703 exchanges signalling with the source gNB DU 701. This signalling may comprise a request to modify an existing UE F1 context.

During 7007, the source gNB CU CP 703 signals the source gNB CU UP 702. This signalling may comprise a request to modify a bearer context already established in respect of the UE. This signalling may comprise at least some of the information relating to the bearer configuration established during 7002 to 7003.

During 7008, the source gNB CU UP 702 signals the source gNB CU CP 703. This signalling may be a response to the signalling of 7007. This signalling may acknowledge the request of 7007.

During 7009, the source gNB CU CP 703 signals the target gNB CU CP 706. This signalling may indicate that the status of source node for the UE from the source node gNB to the target node gNB.

During 7010, in response to the UE attaching to the target gNB via a RACH procedure, the target gNB CU CP 706 signals the target gNB CU UP 705. This signalling may comprise a bearer context modification request in request of the bearer configuration established during 7002 to 7003.

During 7011, the target gNB CU UP 705 signals the gNB CU CP 706. This signalling may comprise a request to the request of 7010. This signalling may comprise an indication that the bearer has been modified.

During 7012, the another network function 707 continues to forward data for the UE to the source gNB CU-CP 702, which in turn forwards this data to the target gNB CU-CP 705.

During 7013, the target gNB CU-CP 706 and the another network function exchange signalling to establish that the target gNB is the new serving node for the UE.

During 7014, for the last time, the another network function 707 signals data for the UE to the source gNB CU-CP 702, which in turn forwards this data to the target gNB CU-CP 705.

During 7015, the another network function 707 signals data for the UE directly to the target gNB CU-UP for the first time.

During 7016, the target gNB CU-CP 706 signals the source gNB CU-CP 703 to indicate that the source gNB may release any remaining UE context it has retained in respect of the UE.

During 7017, the source gNB CU-CP 703 signals the source gNB CU-UP 702. This signalling may indicate that the source gNB CU-UP 702 may release any remaining UE context it has retained in respect of the UE.

During 7018, the source gNB CU-CP 703 signals the source gNB DU 701. This signalling may indicate that the source gNB DU 701 may release any remaining UE F1 context that the source gNB DU has retained in respect of the UE.

During 7019, the source gNB CU-UP 702 signals the source gNB CU-CP 703. This signalling may be a response to the signalling of 7017. This signalling may indicate that any remaining UE context in respect of the UE has been released by the source gNB CU-UP 702.

The distributed Unit (DU) provides support for lower layers of the protocol stack (e.g. the MAC and physical (PHY) layers).

Lower Layer Mobility (LLM) (also referred to as L1/2 inter-cell mobility) is one of the upcoming objectives for mobility enhancements in Rel. 18. Under Rel. 18 procedure discussions, a decision about the cell change is based on Layer 1 (L1) measurements (i.e. PHY measurements) and is made in the MAC layer in the Distributed Unit (DU).

Figure 8:
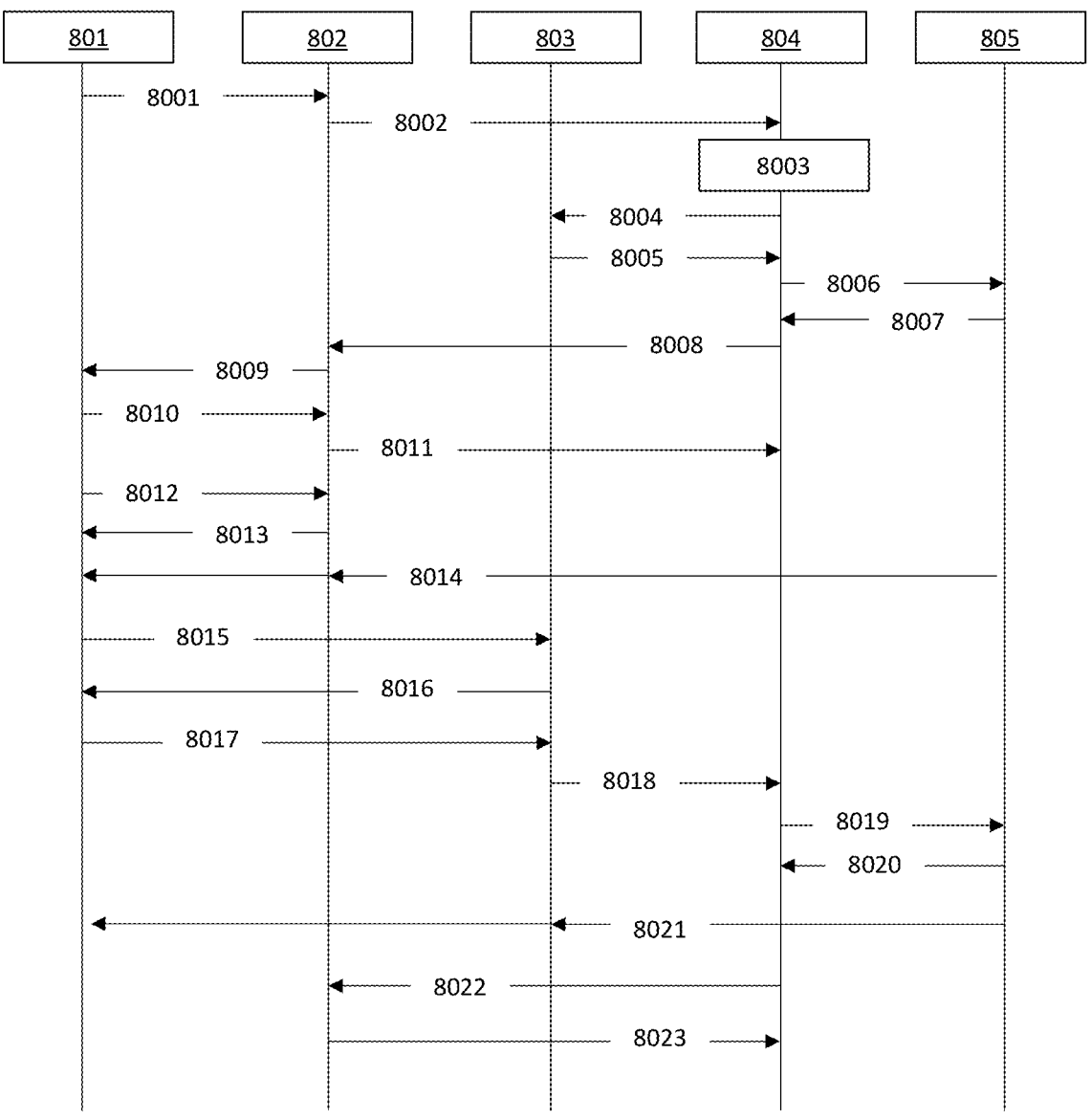

FIG. 8 illustrates an example message exchange for the L1/2 inter cell mobility.

In this example of FIG. 8, based on L3 measurements, a CU-CP decides about the cell preparation (i.e., the CU-CP makes a handover (HO) Decision) and proceeds in setting up the context in the target DU and with performing a bearer context setup in the target DU. The CU-CP subsequently provides Radio Resource Control (RRC) configurations in respect of the target DU to the UE, which in turn provides periodic L1 measurement reports for the serving and prepared target cell(s) to the Source DU.

Based on these measurements the Source DU decides when/if the UE is to be handed over to another DU. When the decision is made, the source DU triggers a node switch, using a MAC CE or any other lower layer signalling. Then the UE is handed over to the Target DU (i.e., performs RACH if necessary and provides RRC reconfiguration complete) and starts receiving data from the target DU.

This is illustrated in more detail in FIG. 8.

FIG. 8 illustrates signalling that may be performed between a UE 801, a source DU 802, a target DU 803, a CU-CP 804, and a CU-UP 805. It is assumed that the CU-UP forwards data for the UE to the source DU 802, which in turn provides the data to the UE 801.

During 8001, the UE 801 signals the source DU 802. This signalling provides measurements on signalling of the target DU 803.

During 8002, the source DU signals the CU-CP 804. This signalling may comprise the measurements received during 8001. This signalling may comprise an uplink RRC message transfer service operation.

During 8003, the CU-CP 804 makes a decision to handover the UE from the source DU 802 to the target DU 803.

During 8004, the CU-CP 804 signals the target DU 803. This signalling may comprise a request for the target DU 803 to establish a UE context in respect of UE 801.

During 8005, the target DU 803 responds to the signalling of 8004. This signalling may indicate that a UE context configuration has been established by the target DU 803 in respect of UE 801.

During 8006, the CU-CP 804 signals the CU-UP 805. This signalling may comprise a request to set up a bearer context in respect of the UE and the target DU 803.

During 8007, the CU-UP 805 responds to the signalling of 8006. This signalling may indicate that a bearer context configuration has been established in respect of the UE 801 and the target DU 803.

During 8008, the CU-CP 804 signals the source DU 802. This signalling may comprise an RRC reconfiguration for the UE 801. The RRC reconfiguration may provide an indication of measurements to be made by the UE 801 for determining when a cell change is to be effected. This signalling may comprise a downlink RRC message transfer service operation.

During 8009, the source DU 802 signals the UE 801. This signalling comprises the RRC reconfiguration signalled during 8008.

During 8010, and in response to the UE 801 applying the RRC reconfiguration signalling during 8009, the UE signals the source DU 802 to indicate that the RRC reconfiguration has been completed.

During 8011, the source DU signals the CU-CP 804. This signaling may comprise an uplink RRC message transfer service operation.

During 8012, the UE 801 signals measurements according to the RRC reconfiguration of 8010 to the source DU 802. These measurements may be L1 measurements.

During 8013, subsequent to the source DU 802 determining from the signalling of 8012 that a cell change is to be effected, the source DU 802 signals the UE 801. This signalling indicates that a cell change is to be effected from the source DU 802 to the target DU 803. This signalling may comprise a MAC CE that triggers the cell change.

During 8014, the CU-UP 805 is still signalling data for the UE 801 to the UE 801 via the source DU 802.

During 8015, the UE 801 initiates a random access procedure with the target DU 803.

During 8016, the target DU 803 responds to the random access procedure signalling of 8015.

Assuming the random access procedure was successfully completed, during 8017, the UE 801 signals the target DU 803. This signaling indicates that the RRC reconfiguration of 8010 has been applied and completed.

During 8018, the target DU 803 signals the CU-CP 804. This signalling may comprise an uplink RRC message transfer service operation. This signalling may comprise an indication that the RRC reconfiguration has been completed.

During 8019, the CU-CP 804 signals the CU-UP 805. This signalling may comprise a request to modify the bearer context currently established in respect of the UE 801 to reflect the change in serving cell from the source DU 802 to the target DU 803.

During 8020, the CU-UP 805 responds to the signalling of 8019. This signaling may confirm that the bearer context modification request of 8019 has been complied with.

During 8021, the CU-UP 805 signals data for the UE 801 via the target DU 803 (according to the bearer context reconfiguration of 8019-8020).

During 8022, the CU-CP 804 signals the source DU 802. This signalling of 8022 requests that the source DU 802 releases UE context in respect of the UE 801.

During 8023, the source DU 802 responds to the signalling of 8022. This signaling nay indicate that the source DU 802 has released any remaining UE context in respect of the UE 801.

The MPE report that is defined in the current 3GPP specifications is already a MAC message sent to the DU. This means that the DU can take the MPE report into account when deciding about directing the UE to a new cell (such as during 8013).

Inter-cell beam management (ICBM) is also discussed in Rel. 17 for enabling a serving cell to configure another assisting cell for data communication. Under ICDM procedures, the UE keeps the serving cell while simultaneously being configured to receive user data from an assisting cell. The MPE reports that are received by the DU may be used as an indication to a serving cell that the serving cell may need to re-direct the transmission/reception responsibilities in respect of a UE to another assisting cell.

Rel. 18 has set a plurality of objectives in respect of low layer mobility procedures (i.e., in respect of L1/L2-bsaed mobility procedures).

In particular, Rel. 18 aims to specify mechanisms and procedures of L1/L2 based inter-cell mobility for mobility latency reduction by considering at least the following aspects:

Configuration and maintenance for multiple candidate cells to allow fast application of configurations for candidate cells Dynamic switch mechanism among candidate serving cells (including Secondary Primary Cells (SpCells) and Secondary Cells (SCells)) for the potential applicable scenarios based on L1/L2 signaling L1 enhancements, including inter-cell beam management, L1 measurement and reporting, beam indication, and for non-synchronized scenario to handle TA management CU-DU interface signaling to support L1/L2 mobility It is understood that the procedure of L1/L2 based inter-cell mobility are applicable to at least the following scenarios: Standalone, carrier aggregation (CA) and New Radio-Dual carrier (NR-DC) case with serving cell change within one cell group; intra-CU cases and intra-CU-inter-DU cases (for Standalone and CA); intra-frequency and inter-frequency cases; and for both frequency range 1 (FR1) and frequency range 2 (FR2).

Based on Rel-16 and Rel-17 MPE features, the source DU is aware of MPE P-MPR as it is a MAC message that is part of PHR.

However, the present application recognizes that the P-MPR value alone does not necessarily represent the actual uplink degradation experienced by the UE due to MPE. For example, while Pcmax scales with P-MPR, MPE will only affect power limited UEs (i.e., MPE will not be applied in respect of UEs transmitting with full/maximum uplink power). Therefore, target cell power control parameters (e.g. P0, alpha) and scheduling information (i.e. target resources in time and frequency) should be used to estimate whether a UE will be power limited towards target cell, hence whether MPE will have a significant impact.

P0 and alpha may be as defined in TS 38.213.

P0 may be a nominal transmission power to be used by the UE in order for uplink transmissions made by the UE to reach an access point/gNB.

Alpha may be a scaling factor used for open loop power control that is multiplied with path loss to allocate more or less power to UEs located at a cell's edge compared to UEs located closer to the centre of the cell.

For example, assume the case when a UE is located at a cell's edge and P0 could be −80 dBm and alpha could be 0.8. In this case, the UE computes a downlink path loss and estimates the power the UE needs to transmit at in order to reach the target cell. Power control parameters of a gNB may therefore be used for UE open loop power control for sending transmissions with a correct amount of power such that the transmissions are detected by an access point/gNB.

The scheduling information may comprise resources (e.g., time and/or frequency resources) that are allocated to a UE for use by the UE in transmitting uplink to the target cell.

As the MPE is provided to the DU as a lower layer message and not as an RRC message, the source/target CU is not aware of MPE. Therefore, the actual uplink degradation due to MPE towards target cells cannot be estimated by the control unit. The CU therefore cannot do accurate uplink degradation estimations without MPE awareness reported by the UE.

Figure 9:
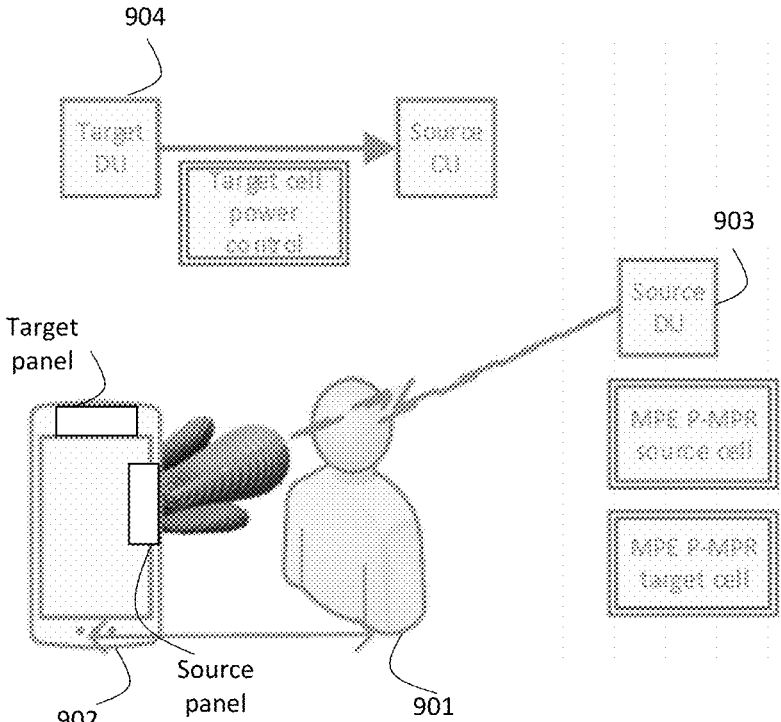
FIG. 9 illustrates example network architecture configuration.

FIG. 9 illustrates information that is currently available in the CU and/or the DU in respect of uplink degradation.

FIG. 9 illustrates an example in which a user 901 is located a distance of 15 cm from a UE 902, causing a power drop of 6 dB in the present example.

As can be seen in FIG. 9, the UE 902 communicates with a source DU 903, which receives an MPE P-MPR in respect of the source cell and an MPE P-MPR in respect of the target cell. Also shown is a target DU 904, which provides a source CU with a target cell power control for a cell provided by the target DU 904.

In other words, as illustrated in the example of FIG. 9, a source CU is informed of target power control parameters while only the source DU knows about MPE P-MPR of the source and target cells. There is therefore a problem in that the none of the network entities has a full picture to estimate the actual uplink degradation in serving and target cells due to MPE. This leads to inefficient handover decisions being made, which may waste network resources being effected.

To address at least one of the above-mentioned issues, the following proposes mechanisms for enabling a source CU and/or source DU to evaluate uplink degradation due to MPE from serving and target cell links (estimated based on CU assistance information) in order to effect at least one network change.

A first example of the at least one network change is a change to a current radio link between the UE and the source DU when the current uplink radio path is degraded due to MPE event in serving cell. The change of the radio link can be performed by a source CU triggering a higher layer handover (e.g., using signaling above layer 2/MAC layer for effecting a handover). The change of radio link can be performed by a DU triggering a lower layer handover (i.e., using signalling at and/or below layer 2 for effecting a handover). The change of the radio link can be performed by a source DU switching the serving radio link (e.g., in an ICBM use case).

A second example of the at least one network change relates to enabling target cell power parameter and scheduling scaling or even preparing another target cell for handover (e.g. depending on target uplink degradation).

The uplink degradation on target cells may be evaluated at the source DU or at the source CU. These options are respectively illustrated in turn with respect to FIGS. 10A and 10B.

Figure 10B:
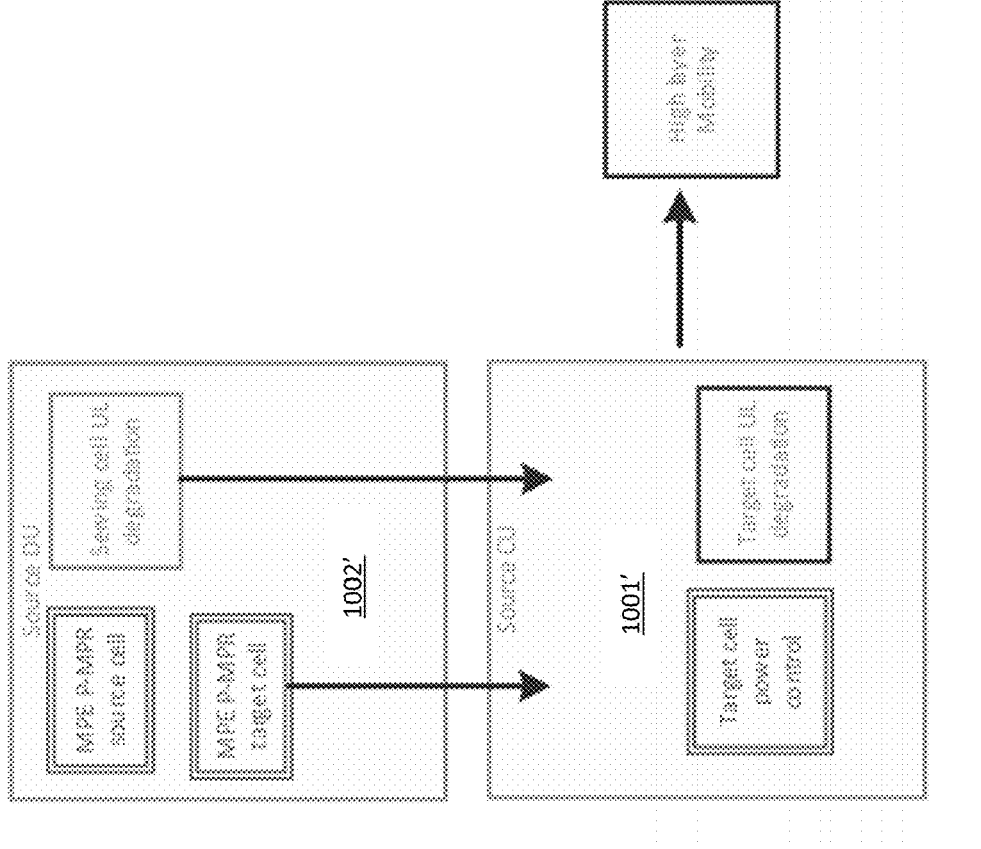
FIGS. 10A and 10B illustrate example signalling between entities described herein.
Figure 10A:
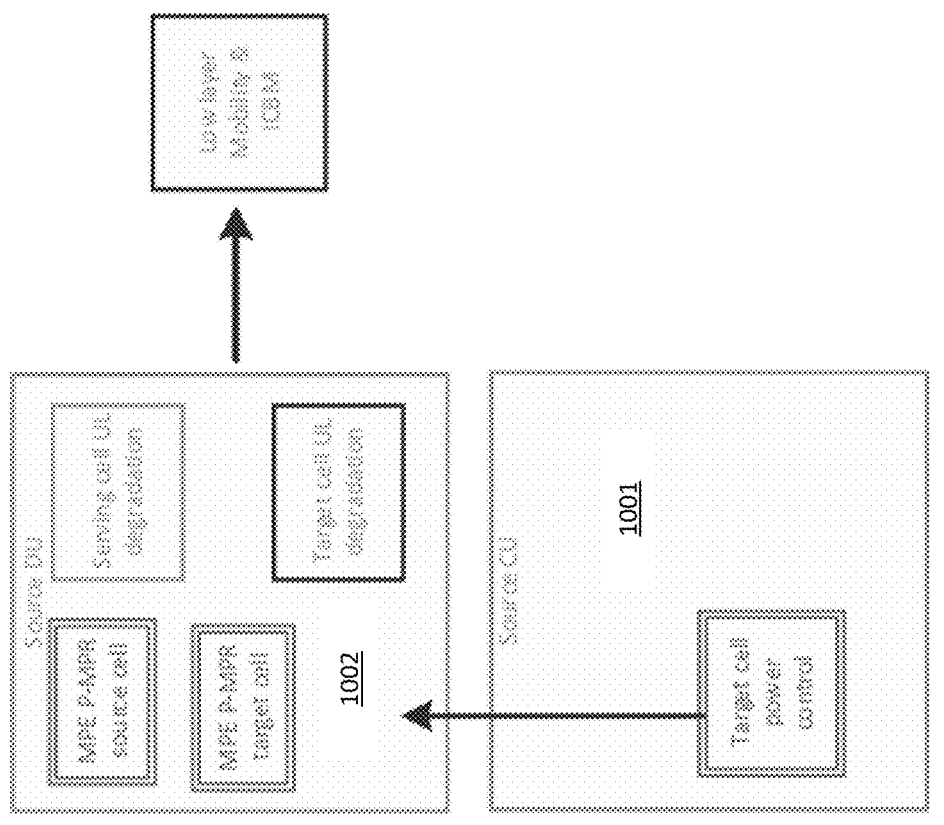

Both mechanisms of FIGS. 10A and 10B are useful for providing full awareness of MPE in mobility. They may be implemented as part of the same network system, or as part of a different network system.

FIG. 10A illustrates an example in which a source DU calculates uplink degradation and triggers a lower layer mobility procedure.

FIG. 10A illustrates a source CU 1001 that comprises information on a target cell's power control parameters. The source CU 1001 is configured to signal this information on the target cell's power control parameters to a source DU 1002. The source DU further comprises an MPE P-MPR in respect of a source cell, an MPE P-MPR in respect of a target cell, and an indication on a serving cell's uplink degradation. The source DU 1002 is configured to output triggers for lower layer mobility and ICBM procedures using all of this information.

As mentioned above, the example of FIG. 10A relates to enabling a source DU to estimate uplink degradation due to MPE in neighboring target cells when determining whether or not to trigger L1/L2 mobility procedures. The target cell MPE uplink degradation estimation at the source DU may be based on exchanged target DU/CU power control parameters forwarded from source CU.

In more detail, a UE may send at least one MPE report to the source DU in respect of a serving source cell and/or at least one neighboring target cell.

The source CU may obtain target cell power control parameters using at least one of two mechanisms.

According to a first mechanism, the source CU may fetch power control parameters from neighboring cells (e.g., prepared cells in Conditional Handover (CHO) or L1/L2 mobility or any other cells) in addition to any scheduling related information providing resources for uplink transmissions. Depending on the load of the target cell, the expected scheduling of (i.e., number of time and/or frequency resources allocated to) this UE by the target cell after handover may be more or less than the scheduling of this UE prior to handover.

According to a second mechanism, a source CU share the UE context with a target DU, and the target DU provides the power control parameters and scheduling related information to the source CU without any resource reservations.

In this second example mechanism, the target DU may inform the source CU about the maximum uplink degradation the target DU can cope with. The target DU may also signal an indication to the source CU that indicates how much the target DU can compensate for the UE power limit due to MPE. This may be indicated in a number of different ways. For example, the target DU may provide the source CU with a lower P0 value for scheduling such that the MPE UE can transmit over higher number of PRBs and thus achieve a better throughput. It is understood that other parameters may be signalled.

The source CU may subsequently forward power control parameters and scheduling related information of other target cell (controlled by other target DU) to the source DU for use by the source DU in estimating the UL degradation on neighboring target cells.

With the MPE information received from the UE on target cells along with the power control information received from target DU via source CU, the source DU can estimate the UL degradation for neighboring target cells.

How the source DU estimates uplink degradation may be determined solely by a configuration of the DU, or may be controlled by the source CU (e.g., the source CU can indicate to DU how the DU should estimate the uplink degradation).

The source DU may decide to trigger a lower layer switch of the serving radio link by using, for example, L1/L2 centric mobility or ICBM instead of sending the report to CU.

The source DU can trigger the L1/L2 cell change based on the MPE UL degradation estimated for neighboring target cells and received L1 beam measurements based on downlink signalling measurements.

Further, for intra-DU lower layer mobility cases, the source CU may to source DU a condition to change the radio link (i.e. trigger low layer mobility) considering the uplink degradation caused by MPE. For example, when a determined uplink degradation of a serving cell is greater than a threshold value, the source DU may be free to decide for the LLM target cell The flow representing this step specifically is illustrated with respect to FIG. 11 for intra-CU inter-DU handover.

Figure 11:
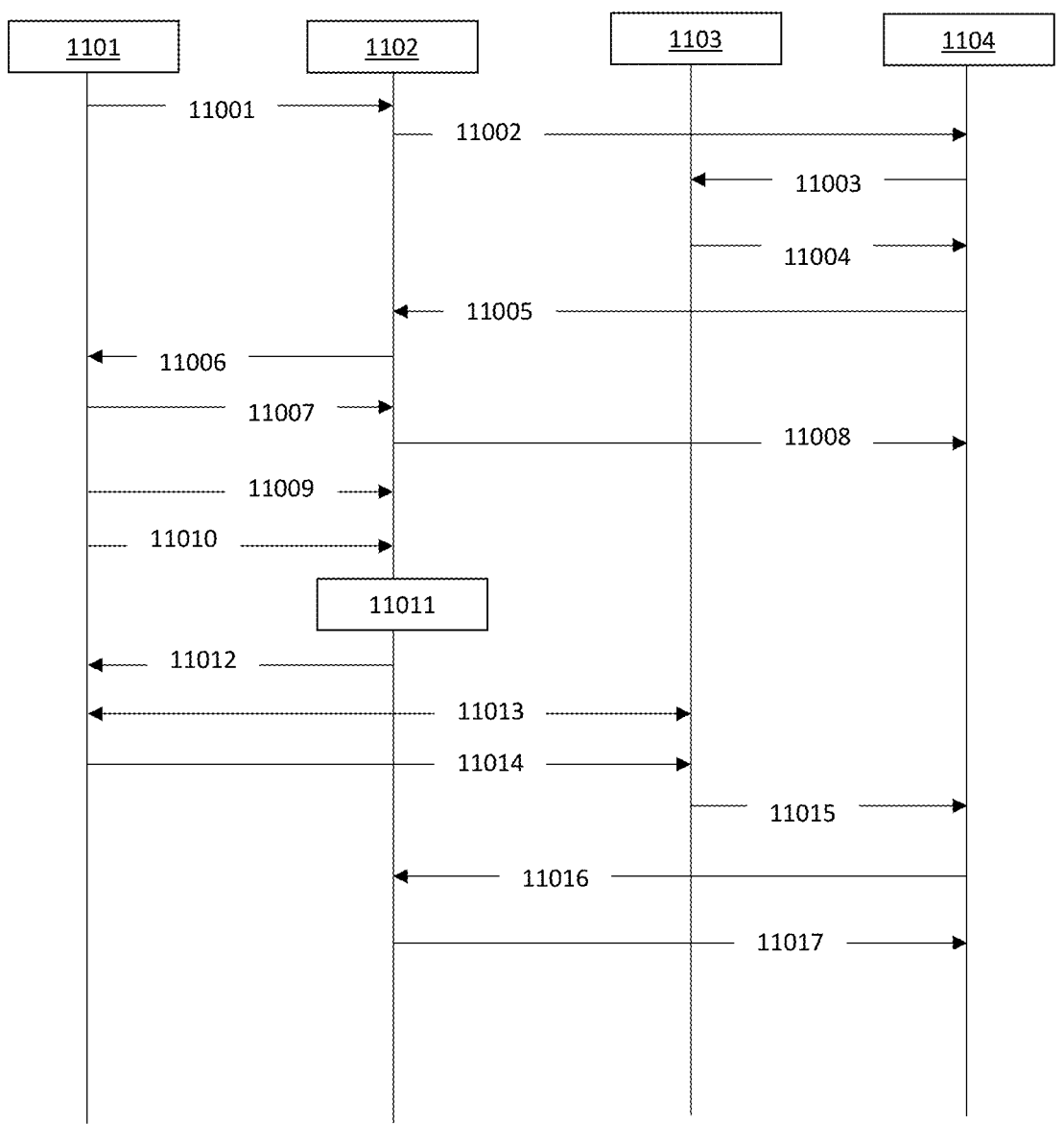
FIGS. 11 to 13 illustrate example signalling between entities described herein.

FIG. 11 illustrates example signalling that may be performed in respect of the example of FIG. 10A.

FIG. 11 illustrates signalling that may be performed between a UE 1101, a source gNB DU 1102, a target gNB DU 1103, and a source gNB-CU 1104. The source gNB DU, target gNB DU, and source gNB-CU may all be provided by the same network node.

During 11001, the UE 1101 signals the source gNB DU 1102. This signalling may comprise a measurement report. The measurement report may comprise an MPE indication. The signalling may thus indicate an MPE event.

During 11002, the source gNB DU 1102 signals the source gNB CU 1104. This signalling may comprise the measurement report received during 11001. This signalling may comprise an uplink RRC message transfer service operation.

During 11003, the source gNB CU 1104 signals the target gNB DU 1103. This signalling may comprise a request for power control parameters and/or for scheduling related information. For example, this signalling may comprise a request for alpha, and/or P0), and/or scheduling related information. This signalling may be comprised in a UE context setup request. The UE context setup request may request that the target gNB DU configure a UE context in respect of UE 1101.

During 11004, the target gNB DU 1103 responds to the signalling of 11003. This signaling may comprise the requested power control parameters and/or the request scheduling related information. For example, this signalling may comprise a request for alpha, and/or P0), and/or scheduling related information. This signalling may be comprised in a UE context setup response. This signalling may be performed subsequent to the target gNB DU 1103 establishing the requested UE context configuration.

During 11005, the source gNB CU 1104 signals the source gNB DU 1102. This signalling may comprise an RRC reconfiguration for the UE 1101 in respect of the target gNB DU 1103.

This signalling may comprise, within the signalled RRC reconfiguration, MPE reporting configuration for configuring the UE to report MPE (via, for example, a MAC control element and/or in an L1 beam measurement report).

This signalling may comprise, outside the signalled RRC reconfiguration, power control parameters provided by the target gNB DU 1103 during 11004.

This signalling may comprise, outside the signalled RRC reconfiguration, scheduling related information of the target gNB DU 1103 provided during 11004.

This signalling may comprise, outside the RRC reconfiguration, an instruction to enable, at the source gNB-DU uplink degradation estimation based on MPE reporting from the UE 1101.

This signalling may comprise, outside the RRC reconfiguration, a trigger decision to be made based on a configured MPE event condition. This trigger decision may be provided via, for example, a MAC control element.

This signalling may comprise, for example, a downlink RRC message transfer service operation.

During 11006, the source gNB DU 1102 signals the UE 1101. This signalling may comprise the RRC reconfiguration received during 11005. This signalling may comprise an indication that MPE reporting is to be provided in L1 beam measurement reports.

During 11007, the UE 1101 responds to the signalling of 11006. This response may be provided when the UE 1101 has applied the RRC reconfiguration signalled during 11006. This response may thus be said to indicate an acknowledgement of the RRC reconfiguration signalled during 11006.

During 11008, the source gNB DU 1102 signals the source gNB CU 1104. This signalling may comprise an indication that the RRC reconfiguration of the UE 1101 has been completed. This signalling may comprise, for example, an uplink RRC message transfer service operation.

During 11009, the UE 1101 signals the source gNB DU 1102. This signalling may comprise L1 beam measurements for both serving and non-serving cells. These measurements may be made according to the RRC reconfiguration received during 11006.

During 11010, the UE 1101 signals the source gNB DU 1102. This signalling may comprise L1 beam measurements for both serving and non-serving cells. These measurements may be made according to the RRC reconfiguration received during 11006. Contrary to 11009, during 11010 the UE additionally provides an MPE reporting that indicates that an MPE event has occurred. The MPE event is assumed to have occurred at some point between 11009 and 11010.

During 11011, the source gNB DU 1102 estimates an uplink degradation on at least one of the source gNB DU 1102 and the target gNB DU 1103 (assuming that these entities respectively represent serving and non-serving cells).

During 11012, the source gNB 1102 signals the UE 1101. This signalling is performed in response to the estimation of 11011 indicating that a cell change would be beneficial for the UE in terms of the UE receiving data. This signalling may comprise an indication that the UE should switch its serving cell to the target gNB DU 1103. This indication may be provided via, for example, a MAC control element that specifically triggers the initialization of a cell change procedure.

During 11013, the UE 1101 and the target gNB DU 1103 exchange signalling. This exchanged signalling may related to a random access procedure for allowing the UE 1101 to receive data for the UE 1101 via the target gNB DU. In other words, this exchange of signalling may enable the target gNB DU 1103 to provide a serving cell to the UE 1101.

During 11014, the UE 1101 signals the target gNB DU 1103. This signalling may indicate that the UE 1101 has performed an RRC reconfiguration for handing over to the target gNB DU 1103 from the source gNB DU 1102. In other words, this signalling may comprise an RRC reconfiguration complete indication.

During 11015, the target gNB DU 1103 signals the source gNB CU 1104. This signalling may forward the RRC reconfiguration complete indication from the UE 1101 to the source gNB CU 1104.

During 11016, the source gNB CU 1104 signals the source gNB DU 1102. This signalling may comprise an instruction to release any UE context for the UE 1101 that is still retained by the source gNB DU 1102. This signalling may comprise a UE context release command service operation.

In response to this signalling of 11016, the source gNB DU 1102 releases any UE context stored by the source gNB DU 1102 for the UE 1101, and signals (during 11017) a response to the signalling of 11016 that indicates this release has occurred. The signalling of 11017 may comprise a UE context release complete service operation.

Figure 13:
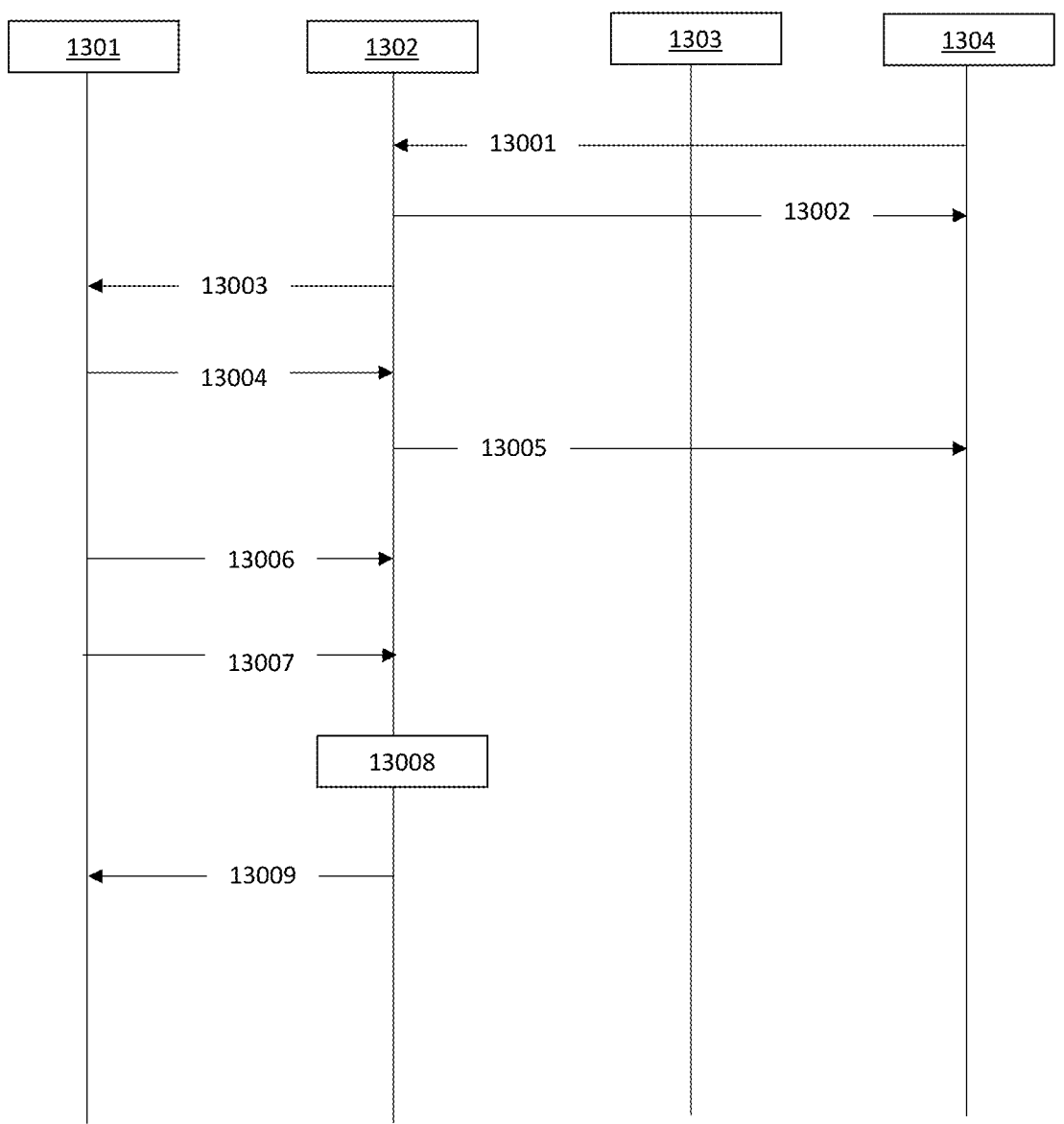

FIG. 13 illustrates example signalling for another option for a CU configuring a serving/source DU to trigger a radio link change event after considering uplink degradation caused by MPE. This example may be said to relate to, for intra-DU lower layer mobility cases, a, source CU indicates to source DU that a condition to change the radio link (i.e. trigger low layer mobility procedure) when, for example, a determined uplink degradation of the serving cell for a UE (based on UE-reported L1 beam measurements) is higher that a threshold value. In this example, the source DU is free to select a lower layer mobility (LLM) target cell. A call flow representing this example is illustrated with respect to FIG. 13 for intra-CU inter-DU handover.

FIG. 13 illustrates signalling that may be performed between a UE 1301, a serving DU 1302, a target DU 1303, and a CU-CP 1304.

During 13001, the CU-CP 1304 signals the serving DU 1302. This signalling may comprise a UE context modification request.

This signalling may comprise an RRC reconfiguration for reconfiguring the UE 1301 for performing L1 measurements.

This signalling may comprise respective LLM configurations for each of a plurality of prepared cells. This signalling may comprise respective LLM trigger conditions for deploying/activating the each of the plurality of prepared cells. This signalling may comprise a specific indicator (such as, for example, a flag) for enabling LLM based on DU implementation, in case of an MPE event being detected.

This signalling may comprise a UE context modification request service operation.

During 13002, the serving DU 1302 signals the CU-CP 1304. This signalling may indicate that the UE context has been modified by the serving DU 1302. This signalling may comprise a UE context modification response service operation.

During 13003, the serving DU 1302 signals the UE 1301. This signalling may comprise an RRC reconfiguration instruction for reconfiguring the UE 1301. The RRC reconfiguration instruction may configure the UE for measurement reporting and MPE reporting with P-MPR towards the serving DU 1302.

During 13004, the UE 1301 responds to the signalling of 13003. This response may indicate that the UE 1301 has successfully completed an RRC reconfiguration.

During 13005, the serving DU 1302 forwards the RRC reconfiguration complete notification received during 13004 to the CU-CP 1304. This signalling may comprise an uplink RRC message transfer service operation.

During 13006, the UE 1301 reports P-MPR to the serving DU 1302. This report may comprise an indication that the UE has detected an MPE towards the serving DU 1302.

During 13007, the UE 1301 reports respective L1 measurements in respect of the plurality of different prepared cells.

During 13008, the serving DU 1302 detects that an MPE-based event occurred (e.g., based on the signalling of 13006), and determines that the UE should effect a cell change to a cell prepared by the target DU 1303. Further, the serving DU may determine to disregard an LLM condition for recovering uplink for the UE when it is determined that the UE should effect such a cell change. For example, the DU may be configured with a condition for triggering a LLM event for the UE during 7001, while also being configured to abstain from performing this triggering when the condition is met during a same time period that an MPE event is detected. The same time period may comprise a preconfigured time period immediately subsequent to detection of the MPE event.

In other words, during 13008, there is a condition (i.e. UL degradation caused by MPE) that, when met, triggers a radio link change. When the condition is met, the serving DU decides to trigger L1 cell change. A downlink radio link measurement may also be considered by the serving DU when the serving DU is making a radio link decision in relation to a cell change.

FIG. 10B illustrates an example in which a source CU calculates uplink degradation and triggers a higher layer mobility procedure.

FIG. 10B illustrates a source DU 1002' that comprises an MPE P-MPR in respect of a source cell, an MPE P-MPR in respect of a target cell, and an indication on a serving cell's uplink degradation. The source DU 1002' is configured to signal this information to a source CU 1001'. The source CU 1001' further comprises a target cell's power control parameter. The source CU 1001' is configured to output triggers for higher layer mobility procedures.

This second example relates to a case in which uplink degradation for a UE is calculated at the source CU. In this case, the source DU estimates MPE uplink degradation on a serving cell and forwards the estimated MPE uplink degradation to a source CU. The source CU may subsequently estimate MPE UL degradation on target cells based on the UE MPE P-MPR report on the target forwarded by source DU and based on the power control parameters of target cell received from the target cell.

Therefore, in this second example, information about uplink radio/throughput degradation in a serving cell is forwarded from a source DU to a source CU. The source DU may inform source CU of UL degradation in the serving cell due to MPE for a power-limited UE in a number of different ways. For example, the source DU may indicate X dB degradation once it receives an MPE report from a UE operating in a power limited state.

The source DU may signal an MPE-based uplink degradation report in response to both the source DU receiving an MPE report from a UE and the source DU determining that the UE is operating in a power limited mode. The source DU may abstain from signalling the MPE-based uplink degradation in response to both the source DU receiving an MPE report and the source DU determining that the UE is not operating in a power limited mode. The source DU may also abstain from signalling the MPE-based uplink degradation when no MPE report has been received from a UE.

When the source DU sends the target cell MPE P-MPR report to the source CU, the source CU may estimate a target cell uplink degradation and trigger handover in case of large uplink degradation in source cell (i.e., larger than a first threshold amount), and/or trigger preparation of another target cell for handover when a large uplink degradation is estimated for a current target cell. Handover may be effected using, for example, layer 3 (e.g., network-layer) signalling.

In one example, the source DU may forward the MPE MAC report sent from the UE to source DU to the source CU. This forwarded MPR MAC report may comprise at least one respective MPE P-MPR values of the source cell and/or neighboring target cells.

In another example, the MPE-based uplink degradation report sent from the source DU to source CU may comprise information about the uplink degradation in the source and/or neighboring target cells.

Figure 12:
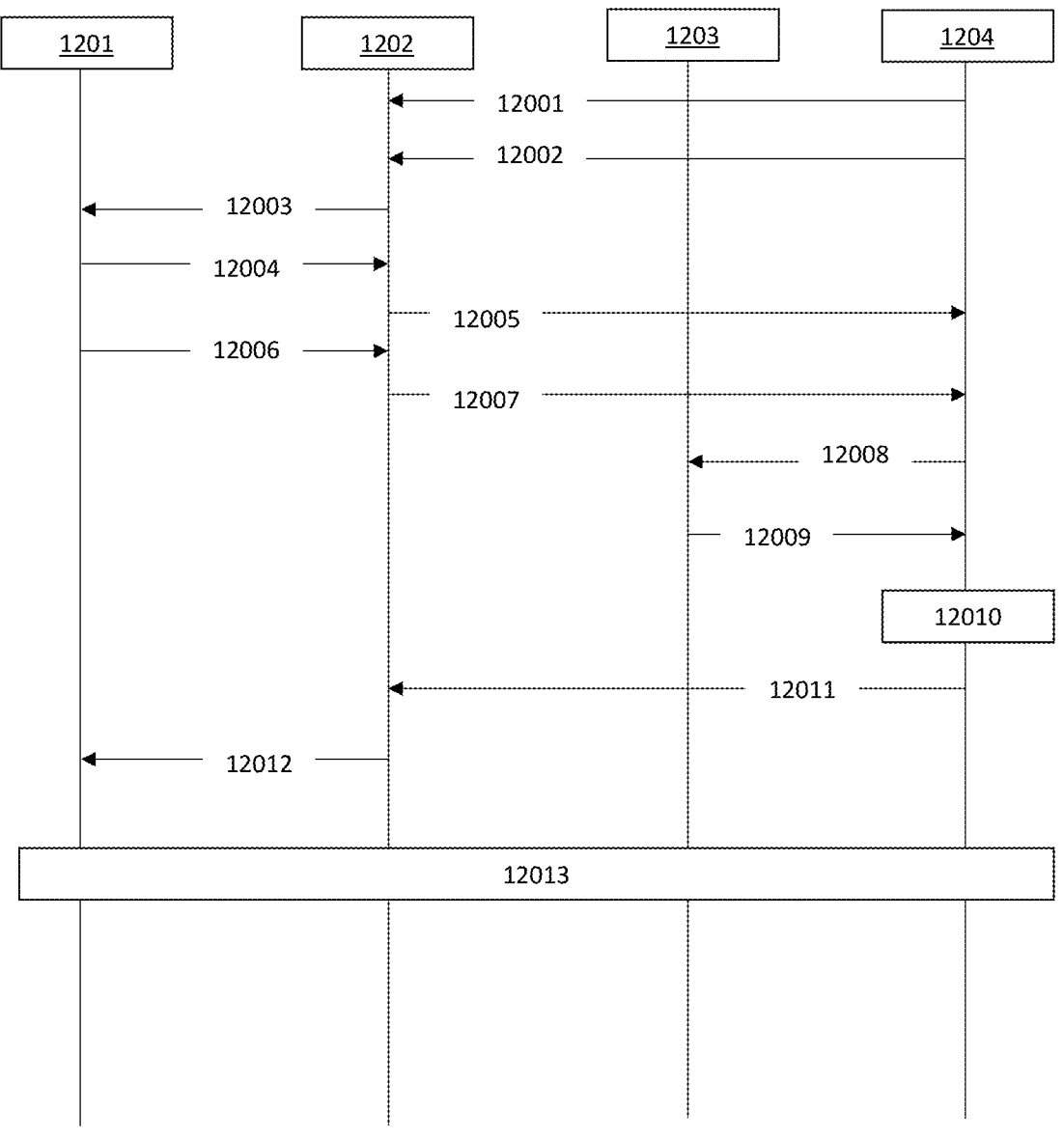

Example signalling for performing aspects of the example of FIG. 10B is illustrated with respect to FIG. 12.

FIG. 12 illustrates signalling that may be performed between a UE 1201, a source gNB DU 1202, a target gNB DU 1203, and a source gNB CU 1204.

During 12001, the source gNB CU 1204 signals the source gNB DU 1202. This signalling may cause the source gNB DU 1202 to be configured to report MPE uplink degradation to the source gNB CU 1204.

During 12002, the source gNB CU 1204 signals the source gNB DU 1202. This signalling may comprise an RRC configuration for configuring the UE 1201. This signalling may comprise an RRC configuration for causing the UE 1201 to report MPE events directly to the source gNB DU 1202. This signalling may comprise at least one condition and/or trigger event for causing the UE 1201 to report an MPE event directly to the source gNB DU 1202. This signalling may comprise a downlink RRC message transfer service operation.

During 12003, the source gNB DU 1202 may signal the UE 1201. This signaling may comprise the RRC reconfiguration signaled during 12002. This signalling may cause the UE 1201 to, on receipt of the signalling, be configured to report MPE events directly to the source gNB DU 1202. This signalling may comprise at least one condition and/or trigger event for causing the UE 1201 to report an MPE event directly to the source gNB DU 1202.

During 12004, the UE 1201 signals the source gNB DU 1202. This signalling may indicate that the UE 1201 has successfully reconfigured itself according to the RRC reconfiguration received during 12003.

During 12005, the source gNB DU 1202 signals the source gNB CU 1204. This signalling may indicate that the UE 1201 has successfully reconfigured itself according to the RRC reconfiguration received during 12002. This sig-nalling may comprise an uplink RRC message transfer service operation.

During 12006, the UE 1201 signals a measurement report to the source gNB DU 1202 in accordance with the RRC reconfiguration of 12003. This measurement report may comprise, outside of the measurement report itself, an indi-cation that an MPE-based event has occurred. The signalling of 12006 may comprise a flag or some other specific indicator for indicating the reason for the MPE-based event.

During 12007, the source gNB DU 1202 signals the source gNB CU 1204. This signalling may comprise the measurement report received from the UE 1201 during 12006. This signalling may comprise a specific indication that an MPE event has occurred. This signaling may com-prise parameters such as, for example, alphas, P0, and/or scheduling information. As mentioned above, this signalling may be performed when the source gNB DU 1202 deter-mines that the reporting is to be made, which may be based on an estimate of an MPE-based uplink degradation being more than a threshold amount.

During 12008, the source gNB CU 1204 signals the target gNB DU 1203. This signaling may comprise a request to establish a UE context in respect of the UE 1201. This signaling may comprise a request for alpha, P0, and/or scheduling parameters associated with the target gNB DU 1203. The signaling of 12008 may comprise a UE context setup request service operation.

During 12009, the target gNB DU 1203 responds to the signalling of 12008. This signalling may comprise the requested alpha, P0, and/or scheduling parameters associ-ated with the target gNB DU 1203. The signaling of 12009 may comprise a UE context setup response service opera-tion.

During 12010, the source gNB CU 1204 evaluates an uplink degradation for the UE 1201. This evaluation may be based, for example, on the received MPE, and the respective alphas and P0s of both the source and target gNB DUs. The source gNB CU 1204 may determine, based on this evalu-ation, that a radio link change event (e.g., a handover event) is to be performed.

In response to the source gNB CU 1204 determining that a radio link change event is to be performed, the source gNB CU 1204 signals the source gNB DU 1202 during 12011. This signalling may comprise an RRC reconfiguration for the UE 1201.

This signalling may comprise, within the signalled RRC reconfiguration, MPE reporting configuration for configur-ing the UE to report MPE (via, for example, a MAC control element and/or in an L1 beam measurement report).

This signalling may comprise, within the RRC reconfigu-ration instruction, an instruction to include MPE reporting in L1 measurements reported by the UE.

This signalling may comprise, outside the signalled RRC reconfiguration, power control parameters provided by the target gNB DU 1203 during 12009 (e.g., alpha and P0 for the target gNB DU 1203).

This signalling may comprise, outside the signalled RRC reconfiguration, scheduling related information of the target gNB DU 1203 provided during 12009.

This signalling may comprise, outside the RRC recon-figuration, an instruction to enable, at the source gNB-DU uplink degradation estimation based on MPE reporting from the UE 1201.

This signalling may comprise, outside the RRC recon-figuration, a trigger decision to be made by the source gNB DU 1202 based on a configured MPE event condition. This trigger decision may be provided via, for example, a MAC control element.

This signalling may comprise, for example, a downlink RRC message transfer service operation.

During 12012, the source gNB DU 1202 signals the RRC reconfiguration received during 12011 to the UE 1201. This RRC reconfiguration may comprise the instruction to include MPE reporting in L1 measurements reported by the UE.

During 12013, acknowledgement signalling for the RRC reconfiguration signalling and handover to the target gNB DU 1203 is performed, such as per 11007 to 11017.

Although the above examples of FIGS. 10 to 13 illustrate intra-CU inter-DU handover, it is understood that the same principles may be applied to inter-CU inter-DU handover.

Figures 14, 15:
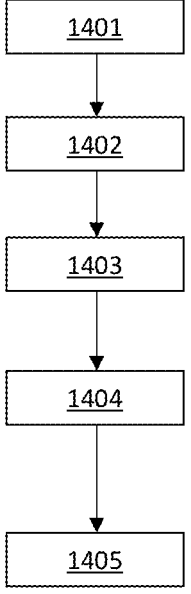
FIGS. 14 and 15 illustrate example operations that may be performed by apparatus described herein.

FIGS. 14 and 15 illustrate aspects of the above examples. It is therefore understood that the following described aspects may find functional correspondence in the above examples, and that features of the above examples may be combined with the following described aspects.

FIG. 14 illustrates features that may be performed by an apparatus for a first distributed unit of a first access point configured to provide a serving cell to a user equipment. The first distributed unit may comprise a source distributed unit for the user equipment.

During 1401, the apparatus receives, from a centralized unit of a second access point, a plurality of power control parameters associated with a target cell and a reconfigura-tion instruction for configuring the user equipment to report uplink measurements with an indication of whether a maxi-mum permissible exposure event has occurred. An MPE event may be an occasion when the UE has limited an uplink transmission power of the UE to comply with a predeter-mined maximum power level. The pre-determined maxi-mum power level may be set by a Government and/or operating communication specification/protocol.

During 1402, the apparatus provides the reconfiguration instruction to the user equipment.

During 1403, the apparatus receive at least one first measurement report from the user equipment in accordance with the reconfiguration instruction.

During 1404, the apparatus causes the at least one first uplink measurement report and the plurality of power con-trol parameters for determining to trigger an uplink signal-ling change procedure at the user equipment for causing the user equipment to be served by the target cell.

During 1405, the apparatus signals the user equipment to trigger said uplink signalling change procedure.

The uplink signalling change procedure may be at least one of a handover procedure; and an inter-cell assistance procedure.

The apparatus may, prior to said receiving from the centralized unit: receive, from the user equipment, at least one second measurement report from the user equipment, the at least one second measurement report comprising an indication that a maximum permissible exposure event has occurred signalling, and forward the received at least one second measurement report to the centralised unit.

The apparatus may, prior to receiving the at least one second measurement report, receive, from the centralized unit, a configuration for causing the first distributed unit to report any received indication of a maximum permissible exposure event degrading an uplink transmission from the user equipment, and, when any measurement report is received by the first distributed unit that indicates that a maximum permissible exposure event has degraded uplink transmissions made by the user equipment, signal said any measurement report to the centralised unit and a plurality of power control parameters associated with the first distributed unit.

The receiving the at least one first uplink measurement report from the user equipment in accordance with the reconfiguration instruction may comprise receiving the at least one first uplink measurement report using layer two signalling.

The apparatus may receive, from the centralised unit, an instruction to abstain from triggering a mobility event at the user equipment when a pre-determined event is detected, the triggering being associated with at least one trigger condition, and abstain from triggering the mobility event when the pre-determined event is detected. The apparatus may monitor the pre-determined event to determine when the pre-determined event has ceased, and when it is determined that the predetermined event has ceased, enabling the triggering of the mobility event when the at least one trigger condition is fulfilled. The mobility event may be a lower layer mobility event, and/or the pre-determined event may be the receipt of a Maximum Permissible Exposure event report from the user equipment. The MPE report may indicate that the MPE is occurring. The apparatus may determine that the predetermined event has ceased when: a predetermined time has passed since receiving the MPE event report indicating that an MPE event is occurring, and/or the apparatus receives a measurement report from the UE that (implicitly (e.g., via the lack of an explicit indication indicating that the MPE event is occurring) or explicitly) indicates that the MPE event has ceased.

FIG. 15 illustrates operations that may be performed by a method for an apparatus for a centralized unit of a second access point. The centralized unit of the second access point may be a source CU for the user equipment discussed above in relation to FIG. 14. The centralized unit of FIG. 15 may correspond to the centralized unit discussed above in relation to FIG. 14.

signalling, to a first distributed unit of a first access point configured to provide a serving cell to a user equipment, a plurality of power control parameters associated with a target cell and a reconfiguration instruction for configuring the user equipment to report uplink measurements with an indication of whether a maximum permissible exposure event has occurred.

The apparatus may signal, to the first distributed unit, a configuration for causing the first distributed unit to report any received indication of a maximum permissible exposure event degrading an uplink transmission from the user equipment, and receive, from the first distributed unit, at least one first measurement report comprising an indication that a maximum permissible exposure event has degraded uplink transmissions made by the user equipment and a plurality of power control parameters associated with the first distributed unit.

The apparatus may, in response to receiving said indication, signal, to a second distributed unit configured to provide the target cell, a request for the plurality of power control parameters associated with the target cell, receive, from the second distributed unit, the requested plurality of power control parameters associated with the target cell; use the at least one first uplink measurement report and the plurality of power control parameters associated with the first and second distributed units for determining to trigger an uplink signalling change procedure at the user equipment for causing the user equipment to be served by the target cell; and signal the reconfiguration instruction to trigger said uplink signalling change procedure.

The uplink signalling change procedure may be at least one of a handover procedure; and an inter-cell assistance procedure.

The apparatus may signal, to the first distributed unit, an instruction to abstain from triggering a mobility event at the user equipment when a pre-determined event is detected, the triggering being associated with at least one trigger condition.

The mobility event may be a lower layer mobility event, and/or the pre-determined event may be the receipt of a Maximum Permissible Exposure event report from the user equipment.

In both of the examples of FIGS. 14 and 15, the plurality of power control parameters may be provided in the same signalling as the reconfiguration instruction, but separately from the reconfiguration instruction.

In both of the examples of FIGS. 14 and 15, the plurality of power control parameters associated with the target cell and the reconfiguration instruction for configuring the user equipment to report uplink measurements with an indication of whether a maximum permissible exposure event has occurred may be signalled using network layer signalling.

In both of the examples of FIGS. 14 and 15, the plurality of power control parameters may comprise at least one of: a baseline power to use for uplink transmissions to be made by the user equipment; a scaling factor for use by the user equipment during open loop power control procedures; and time and/or physical resources for use by the user equipment for uplink transmissions.

Figure 2:
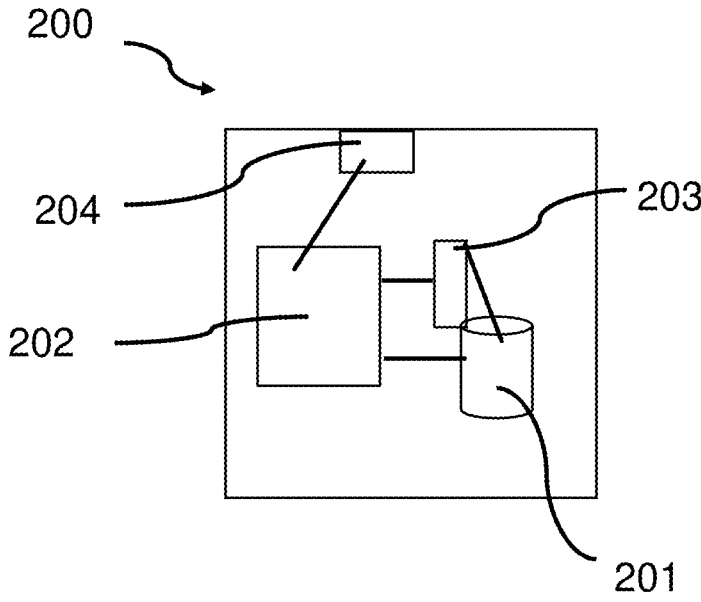
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth. The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
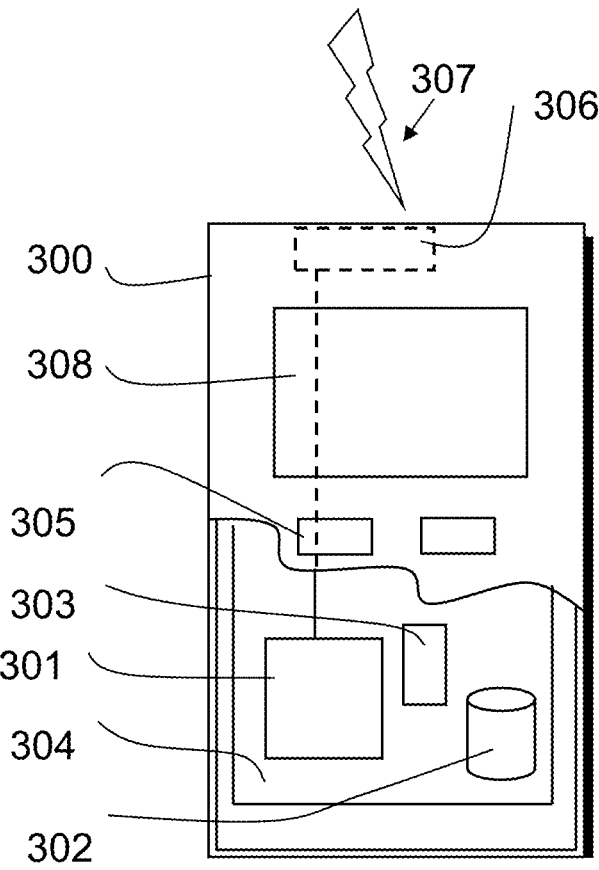
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of Tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
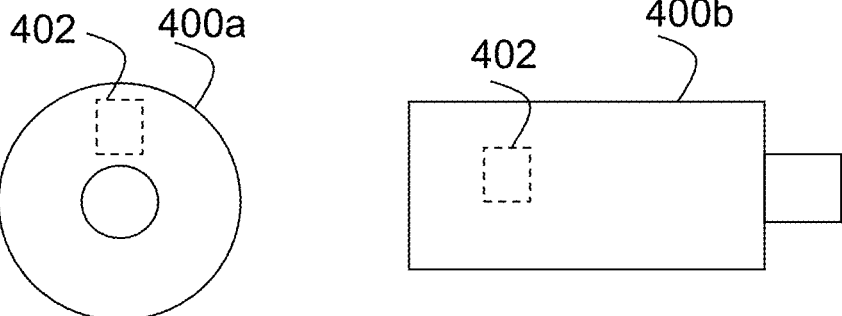
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 14, and/or FIG. 15, and/or methods otherwise described previously.

As provided herein, various aspects are described in the detailed description of examples and in the claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIG. 14, and/or FIG. 15, and/or otherwise described previously, may represent program steps, or interconnected logic circuits, blocks and functions, or a combination of program steps and logic circuits, blocks and functions. The software may be stored on such physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as nonlimiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
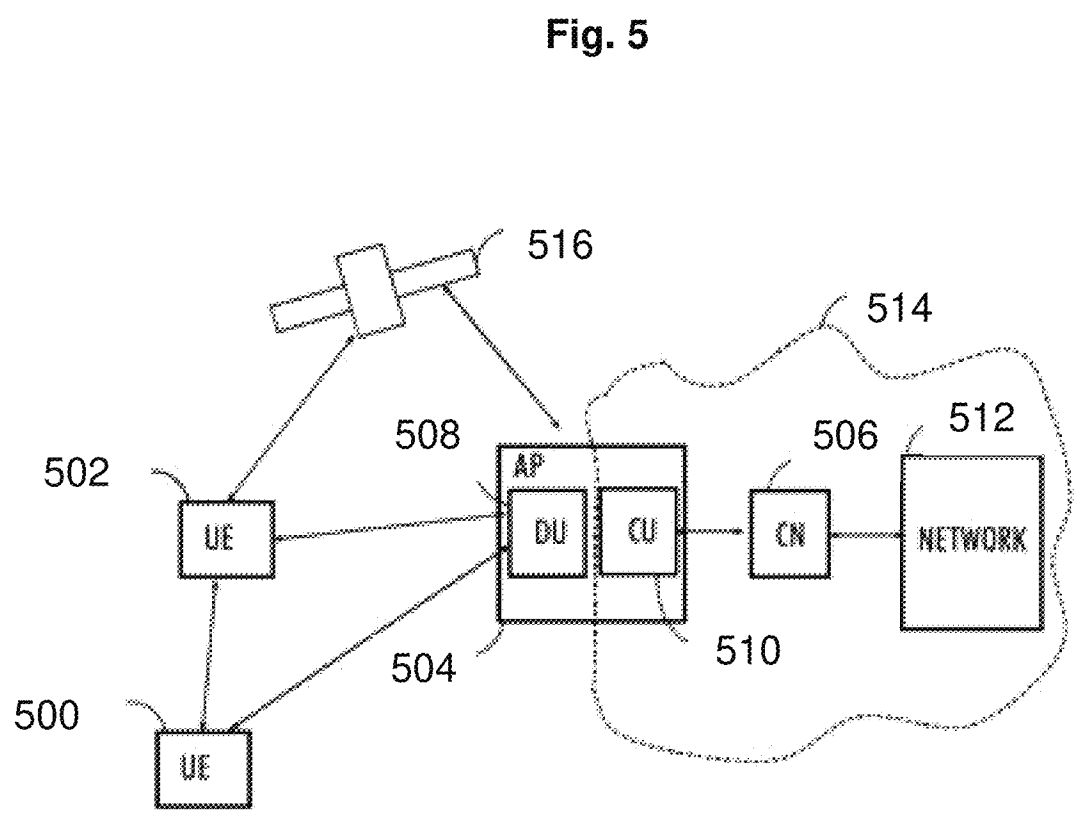

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g)NodeB serving devices in a cell. In one example, the node 504 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 506 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The LTE network architecture is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 5 may provide any kind of these cells. A cellular radio system may be implemented as a multilayer network including several kinds of cells. Typically, in multilayer networks, one access node.

According to an embodiment of the methods as disclosed herein, the plurality of power control parameters is provided in the same signalling as the reconfiguration instruction, but separately from the reconfiguration instruction.

According to an embodiment of the methods as disclosed herein, the plurality of power control parameters associated with the target cell and the reconfiguration instruction for configuring the user equipment to report uplink measurements with an indication of whether a maximum permissible exposure event has occurred are signalled using network layer signalling.

According to an embodiment of the methods as disclosed herein, the plurality of power control parameters comprise at least one of: a baseline power to use for uplink transmissions to be made by the user equipment; a scaling factor for use by the user equipment during open loop power control procedures; and time and/or physical resources for use by the user equipment for uplink transmissions.

What is claimed is:

1. A method performed by a first distributed unit of a first access point configured to provide a serving cell to a user equipment, the method comprising:

receiving, from a centralized unit of a second access point, a plurality of power control parameters associated with a target cell and a reconfiguration instruction that configures the user equipment to report uplink measurements with an indication of whether a maximum permissible exposure event has occurred, wherein the plurality of power control parameters comprises a nominal transmission power (P0) and an alpha;

receiving, from the centralized unit, an instruction to abstain from triggering a lower layer mobility event at the user equipment upon detection of a pre-determined event, wherein the pre-determined event is a receipt of a maximum permissible exposure event report from the user equipment, and wherein the triggering of the lower layer mobility event is associated with at least one trigger condition;

providing the reconfiguration instruction to the user equipment via Radio Resource Control RRC) signalling;

receiving, using layer two signalling, at least one first uplink measurement report from the user equipment in accordance with the reconfiguration instruction, wherein the at least one first uplink measurement report comprises the indication that the maximum permissible exposure event has occurred;

in response to detecting the pre-determined event based on the at least one first uplink measurement report that is received, abstaining from triggering the lower layer mobility event;

based on the at least one first uplink measurement report and the plurality of power control parameters, determining to trigger an uplink signalling change procedure at the user equipment to cause the user equipment to be served by the target cell, wherein the uplink signalling change procedure is at least one of a handover procedure and an inter-cell assistance procedure;

signalling the user equipment, using a Medium Access Control, (MAC) control element, to trigger the uplink signalling change procedure;

monitoring the pre-determined event to determine that the pre-determined event has ceased; and in response to determining that the pre-determined event has ceased, enabling the triggering of the lower layer mobility event upon fulfilment of the at least one trigger condition, wherein the determination that the pre-determined event has ceased is based on a receipt of the at least one first uplink measurement report from the user equipment that does not indicate that the maximum permissible exposure event is occurring.

2. The method as claimed in claim 1, the method comprising, prior to receiving from the centralized unit:

receiving, from the user equipment, at least one second uplink measurement report comprising an indication that the maximum permissible exposure event has occurred; and forwarding the received at least one second uplink measurement report to the centralized unit.

3. The method as claimed in claim 2, the method comprising, prior to receiving the at least one second uplink measurement report:

receiving, from the centralized unit, a configuration for causing the first distributed unit to report any received indication of the maximum permissible exposure event degrading one or more uplink transmissions from the user equipment; and when one or more measurement reports are received by the first distributed unit indicating that the maximum permissible exposure event has degraded one or more uplink transmissions from the user equipment, signalling the one or more measurement reports to the centralized unit and a plurality of power control parameters associated with the first distributed unit.

4. An apparatus configured as a first distributed unit of a first access point configured to provide a serving cell to a user equipment, the apparatus comprising: at least one processor; and at least one memory comprising code that, when executed by the at least one processor, causes the apparatus to perform:

receiving, from a centralized unit of a second access point, a plurality of power control parameters associated with a target cell and a reconfiguration instruction that configures the user equipment to report uplink measurements with an indication of whether a maximum permissible exposure event has occurred, wherein the plurality of power control parameters comprises a nominal transmission power (P0) and an alpha;

receiving, from the centralized unit, an instruction to abstain from triggering a lower layer mobility event at the user equipment upon detection of a pre-determined event, wherein the pre-determined event is a receipt of a maximum permissible exposure event report from the user equipment, and wherein the triggering of the lower layer mobility event is associated with at least one trigger condition;

providing the reconfiguration instruction to the user equipment via Radio Resource Control (RRC) signalling;

receiving, using layer two signalling, at least one first uplink measurement report from the user equipment in accordance with the reconfiguration instruction, wherein the at least one first uplink measurement report comprises the indication that the maximum permissible exposure event has occurred;

in response to detecting the pre-determined event based on the at least one first uplink measurement report that is received, abstaining from triggering the lower layer mobility event;

based on the at least one first uplink measurement report and the plurality of power control parameters, determining to trigger an uplink signalling change procedure at the user equipment to cause the user equipment to be served by the target cell, wherein the uplink signalling change procedure is at least one of a handover procedure and an inter-cell assistance procedure;

signalling the user equipment, using a Medium Access Control, (MAC) control element, to trigger the uplink signalling change procedure;

monitoring the pre-determined event to determine that the pre-determined event has ceased; and in response to determining that the pre-determined event has ceased, enabling the triggering of the lower layer mobility event upon fulfilment of the at least one trigger condition, wherein the determination that the pre-determined event has ceased is based on a receipt of the at least one first measurement report from the user equipment that does not indicate that the maximum permissible exposure event is occurring.

* * * * *